United States Patent
Kuo et al.

(10) Patent No.: US 12,442,985 B2
(45) Date of Patent: Oct. 14, 2025

(54) SEMICONDUCTOR STRUCTURE AND METHOD OF MANUFACTURING THE SAME

(71) Applicant: TAIWAN SEMICONDUCTOR MANUFACTURING COMPANY LTD., Hsinchu (TW)

(72) Inventors: Feng-Wei Kuo, Hsinchu County (TW); Chewn-Pu Jou, Hsinchu (TW); Hsing-Kuo Hsia, Hsinchu County (TW); Chih-Wei Tseng, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 95 days.

(21) Appl. No.: 17/842,783

(22) Filed: Jun. 17, 2022

(65) Prior Publication Data
US 2023/0408768 A1    Dec. 21, 2023

(51) Int. Cl.
*G02B 6/32* (2006.01)
*G02B 6/12* (2006.01)
(Continued)

(52) U.S. Cl.
CPC ............ *G02B 6/32* (2013.01); *G02B 6/30* (2013.01); *G02B 6/4214* (2013.01); *G02B 2006/12104* (2013.01)

(58) Field of Classification Search
CPC .......... G02B 6/4214; G02B 6/4246; G02B 2006/12104; G02B 6/4204; G02B 6/4206; G02B 6/32
See application file for complete search history.

(56) References Cited

U.S. PATENT DOCUMENTS

2003/0081877 A1* 5/2003 Nakata ............. G02B 6/4214
                                                     385/14
2006/0210213 A1* 9/2006 Huang ............... G02B 6/43
                                                    385/14
(Continued)

FOREIGN PATENT DOCUMENTS

CN       109239838 A   *   1/2019   ............. G02B 6/003

OTHER PUBLICATIONS

"Waveguide." Merriam-Webster.com Dictionary, Merriam-Webster, https://www.merriam-webster.com/dictionary/waveguide. Accessed Feb. 5, 2024. (Year: 2024).*

*Primary Examiner* — Thomas A Hollweg
*Assistant Examiner* — Kirsten D. Endresen
(74) *Attorney, Agent, or Firm* — WPAT LAW; Anthony King

(57) ABSTRACT

A semiconductor structure is provided. The semiconductor structure includes a dielectric layer, a first waveguide structure, a reflective layer, a semiconductive layer, and a micro-lens. The first waveguide structure is disposed in the dielectric layer and extends along a first direction. The reflective layer is disposed in the dielectric layer and includes an inclined surface configured to redirect an optical signal from a second direction to the first direction. The semiconductive layer is disposed over the dielectric layer. The micro-lens is disposed at the semiconductive layer, wherein an optical signal travels into the semiconductive layer through the micro-lens along the second direction. A method of manufacturing the semiconductor structure is also provided.

20 Claims, 35 Drawing Sheets

(51) Int. Cl.
  *G02B 6/30* (2006.01)
  *G02B 6/42* (2006.01)

(56) References Cited

U.S. PATENT DOCUMENTS

| | | | |
|---|---|---|---|
| 2014/0177995 A1* | 6/2014 | Mohammed | G02B 6/4214 385/79 |
| 2021/0141172 A1* | 5/2021 | Zhang | G02B 6/4214 |
| 2021/0157070 A1* | 5/2021 | Nakajima | H01L 31/105 |
| 2023/0091050 A1* | 3/2023 | Zhang | G02B 6/43 385/31 |

* cited by examiner

SEMICONDUCTOR STRUCTURE AND METHOD OF MANUFACTURING THE SAME

BACKGROUND

Optical couplers are frequently used to enable communication between light sources and other components (e.g., photodetectors). For example, the optical coupler can be used to redirect light from an optical fiber to an optical detector. Light passing from one end of the optical coupler and through the optical coupler may reflect off an inner surface of a grating at a shallow angle. Such light may be redirected so that it strikes the inner surface at an angle greater than a critical angle, thus allowing the redirected light to escape from another end of the optical grating. After exiting the optical coupler, the light may impinge upon a detector, where it is detected. The detected light may then be used for various purposes, such as delivery of an encoded communications signal that was transmitted through the optical coupler. The optical couplers are integrated with semiconductor structures in order to convert light signals to electrical signals. Conventionally, an edge coupler is packaged at a same level as an optical fiber device over a substrate, wherein a size of the packaged structure cannot be further reduced.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION

Figure 1:
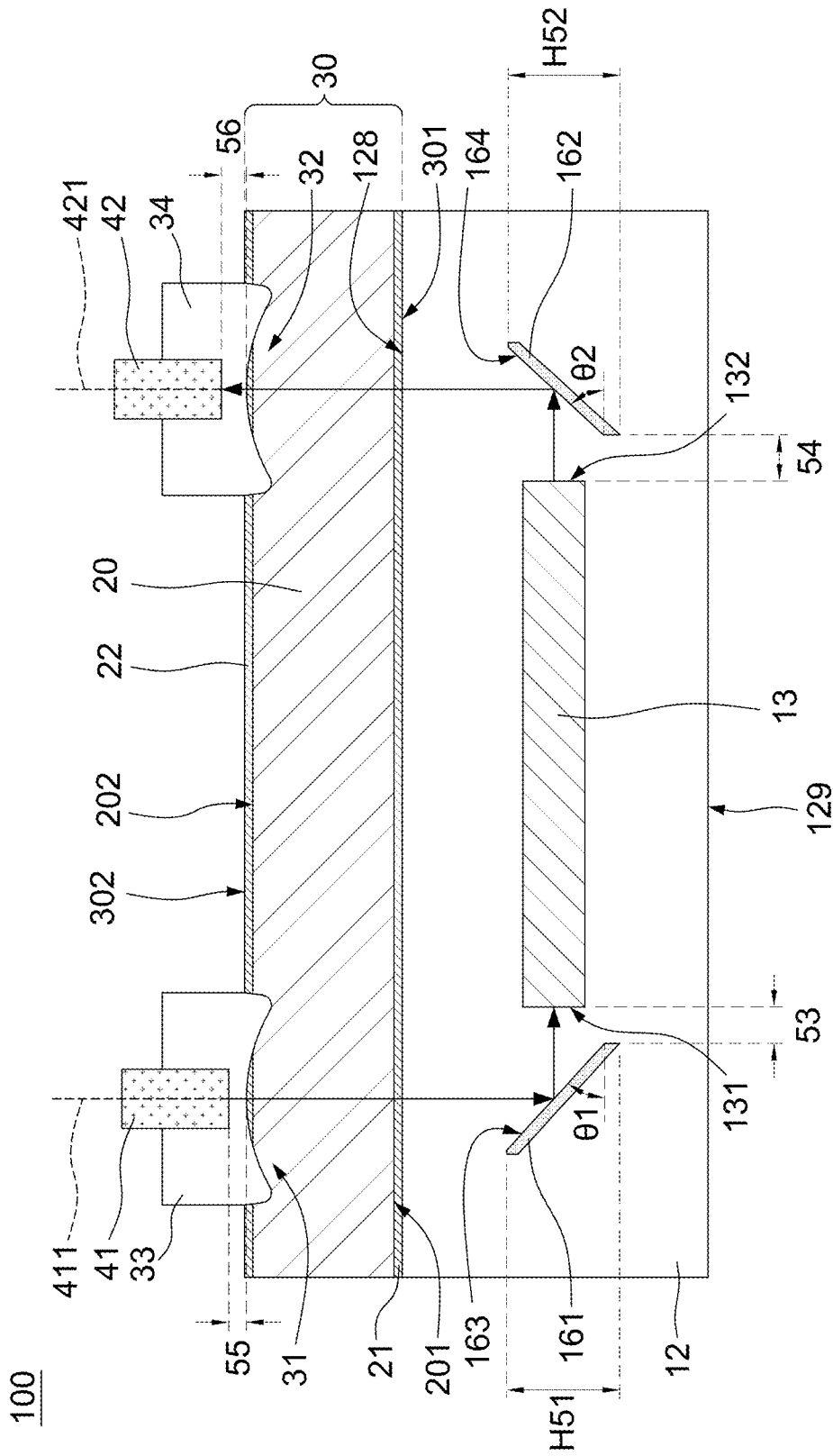
FIG. 1 is a schematic cross-sectional diagram of a semiconductor structure in accordance with some embodiments of the disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic cross-sectional diagram of a semiconductor structure 100 in accordance with some embodiments of the present disclosure. The semiconductor structure 100 may include a semiconductive layer 20, a dielectric layer 12, and an optical reflective layer 161. The semiconductive layer 20 may be a semiconductor substrate, a wafer, or a bulk substrate. In some embodiments, the semiconductive layer 20 includes silicon. In some embodiments, a thickness of the semiconductive layer 20 is in a range of 200 to 1000 microns (μm). The semiconductive layer 20 may have a first surface 201 and a second surface 202 disposed opposite to the first surface 201. In some embodiments, the dielectric layer 12 is disposed over the first surface 201 of the semiconductive layer 20. In some embodiments, the dielectric layer 12 includes oxide. In some embodiments, a thickness of the dielectric layer 12 is in a range of 10 nanometers (nm) to 100 μm.

The optical reflective layer 161 may be disposed within the dielectric layer 12. In some embodiments, the optical reflective layer 161 is separated from the semiconductive layer 20 by a part of the dielectric layer 12. In alternative embodiments, the optical reflective layer 161 contacts a first surface 128 of the dielectric layer 12. In other alternative embodiments, the optical reflective layer 161 contacts a second surface 129 of the dielectric layer 12, wherein the second surface 129 is opposite to the first surface 128. In some embodiments, the first surface 128 is closer to the semiconductive layer 20 than the second surface 129 of the dielectric layer 12. In some embodiments, the optical reflective layer 161 includes one or more metallic elements. In some embodiments, the optical reflective layer 161 includes copper (Cu), gold (Au), aluminum (Al), titanium nitride (TiN), tantalum nitride (TaN), zinc (Zn), tin (Sn), lead (Pb), magnesium (Mg), or a combination thereof.

In some embodiments, a thickness of the optical reflective layer 161 is in a range of 1 to 100 μm. In some embodiments, a height H51 of the optical reflective layer 161 is greater than 40 μm, wherein the height H51 is a vertical distance between a top and a bottom of the optical reflective layer 161. In some embodiments, the height H51 is substantially less than or equal to the thickness of the dielectric layer 12. In some embodiments, the optical reflective layer 161 includes an inclined surface 163, which is configured to redirect a travelling direction of an optical signal (indicated by arrows). In some embodiments, the inclined surface 163 is a planar surface. In some embodiments, an elevation angle $\theta 1$ of the inclined surface 163 is in a range of 1 to 89 degrees, wherein the elevation angle $\theta 1$ is a vertical angle between the inclined surface 163 and a horizontal line as indicated by a dashed line. In some embodiments, the elevation angle $\theta 1$ of the inclined surface 163 is in a range of 30 to 60 degrees. In some embodiments, the elevation angle $\theta 1$ of the inclined surface 163 is in a range of 40 to 50 degrees. In some embodiments, the inclined surface 163 is designed to redirect the optical signal from a vertical direction to a horizontal direction, and the elevation angle $\theta 1$ is adjusted in order to achieve such result.

The semiconductor structure 100 may further include an optical guiding layer 13. In some embodiments, the optical guiding layer 13 is disposed in the dielectric layer 12. In some embodiments, the optical guiding layer 13 is disposed adjacent to the optical reflective layer 161. In some embodiments, the optical guiding layer 13 includes silicon, silicon nitride, another suitable material for optical transmission, or a combination thereof. In some embodiments, a thickness of the optical guiding layer 13 is in a range of 10 nm to 1000 μm. In some embodiments where the optical guiding layer 13 includes silicon nitride, the thickness of the optical guiding layer 13 is greater than 300 nm. In some embodiments where the optical guiding layer 13 includes silicon, the thickness of the optical guiding layer 13 is greater than 300 nm. In some embodiments, the inclined surface 163 of the optical reflective layer 161 faces toward a sidewall 131 of the optical guiding layer 13. In some embodiments, a minimum distance 53 between the optical reflective layer 161 and the optical guiding layer 13 is in a range of 0 to 30 μm.

The semiconductor structure 100 may further include an optical reflective layer 162. The optical reflective layer 162 is disposed within the dielectric layer 12 adjacent to the optical guiding layer 13. In some embodiments, the optical reflective layer 162 is disposed opposite to the optical reflective layer 161. In some embodiments, the optical reflective layer 162 includes an inclined surface 164, which is configured to redirect the optical signal (indicated by arrows). In some embodiments, the inclined surface 164 of the optical reflective layer 162 faces toward a sidewall 132 of the optical guiding layer 13, which is opposite to the sidewall 131. In some embodiments, the optical reflective layer 162 is symmetrical to the optical reflective layer 161 with respect to the optical guiding layer 13. A material and ranges of the thickness and the height H51 of the optical reflective layer 161 illustrated above can be applied to the optical reflective layer 162. In some embodiments, a thickness and a height H52 of the optical reflective layer 162 are similar to or substantially equal to the thickness and the height H51 of the optical reflective layer 161. Similarly, a range of an elevation angle $\theta 2$ of the inclined surface 164 can be similar to or substantially equal to the elevation angle $\theta 1$. Repeated description is omitted herein.

In some embodiments, the semiconductor structure 100 is an optical input/output (I/O) device. An optical signal is input from a fiber 41 toward the optical reflective layer 161 along a first direction or a vertical direction and then is reflected or redirected toward the optical guiding layer 13 along a second direction or a horizontal direction as shown in FIG. 1. The optical signal enters the optical guiding layer 13 from the sidewall 131, travels within the optical guiding layer 13 along a lengthwise direction (i.e., the second direction or the horizontal direction) of the optical guiding layer 13, and leaves the optical guiding layer 13 from the sidewall 132. The optical signal may then travel toward the optical reflective layer 162, which reflects or redirects the optical signal from the second direction (or the horizontal direction) to the first direction (or the vertical direction) toward a fiber 42. In some embodiments, the optical signal is output through the fiber 42. In some embodiments, a diameter of the fiber 41 or 42 is about 9.2 μm. Arrangement of the elements and a pathway of the optical signal shown in FIG. 1 is an exemplary embodiment for illustration of a mechanism and a concept of the present disclosure. In some embodiments, the semiconductor structure 100 includes only one optical reflective layer 161 for redirecting an input optical signal, and the signal is directed toward a photodetector, a logic device, an electronic circuit, or other electrical components for further processing.

For a purpose of preventing signal loss, the semiconductor structure 100 may further include one or more antireflective coating (ARC) layers. In some embodiments, the semiconductor structure 100 includes an ARC layer 21 disposed on the first surface 201 of the semiconductive layer 20. In some embodiments, the ARC layer 21 is disposed between the semiconductive layer 20 and the dielectric layer 12. In some embodiments, the semiconductor structure 100 includes an ARC layer 22 disposed on the second surface 202 of the semiconductive layer 20. In some embodiments, each of the ARC layer 21 and the ARC layer 22 is a multi-layer structure. In some embodiments, one ARC layer 21 or 22 includes at least one silicon nitride sub-layer and at least one silicon oxide sub-layer. In some embodiments, multiple silicon nitride sub-layers and multiple silicon oxide sub-layers are alternately arranged. A number of the silicon nitride sub-layers and a number of the silicon oxide sub-layers can be adjusted according to different applications. Greater numbers of the silicon nitride sub-layers and the silicon oxide sub-layers provide better prevention of signal loss.

In addition, a thickness of one silicon nitride sub-layer or one silicon oxide sub-layer can be adjusted according to different applications, and is not limited herein. In some embodiments, a total thickness of each of the ARC layers 21 and 22 is in a range of 500 angstroms (Å) to 1 μm. In some embodiments, the thickness of one ARC layer 21 or 22 is very small relative to the thickness of the semiconductive layer 20. For ease of illustration, the semiconductive layer 20 and the ARC layers 21 and 22 are collectively referred to as a substrate 30. In some embodiments, the substrate 30 includes a first surface 301 and a second surface 302 opposite to the first surface 301. In some embodiments, the dielectric layer 12 contacts the first surface 301 of the substrate 30. In some embodiments, the optical signal enters the substrate 30 from the second surface 302 of the substrate 30.

In order to ensure that the optical signal is transmitted to the optical guiding layer 13, the semiconductor structure 100 may further include one or more micro-lenses according to a number of fibers (e.g., 41 and 42). In some embodiments, a micro-lens 31 is disposed at the second surface 302 of the substrate 30. In some embodiments, the micro-lens 31 is vertically aligned with the optical reflective layer 161. In some embodiments, a micro-lens 32 is disposed adjacent to the micro-lens 31 at the second surface 302 of the substrate 30. In some embodiments, the micro-lens 32 is vertically aligned with the optical reflective layer 162. In some embodiments the optical signal is input from the fiber 41 as shown in FIG. 1, the micro-lens 31 is configured to focus the optical signal output from the fiber 41 before the optical signal enters the substrate 30.

Figure 2:
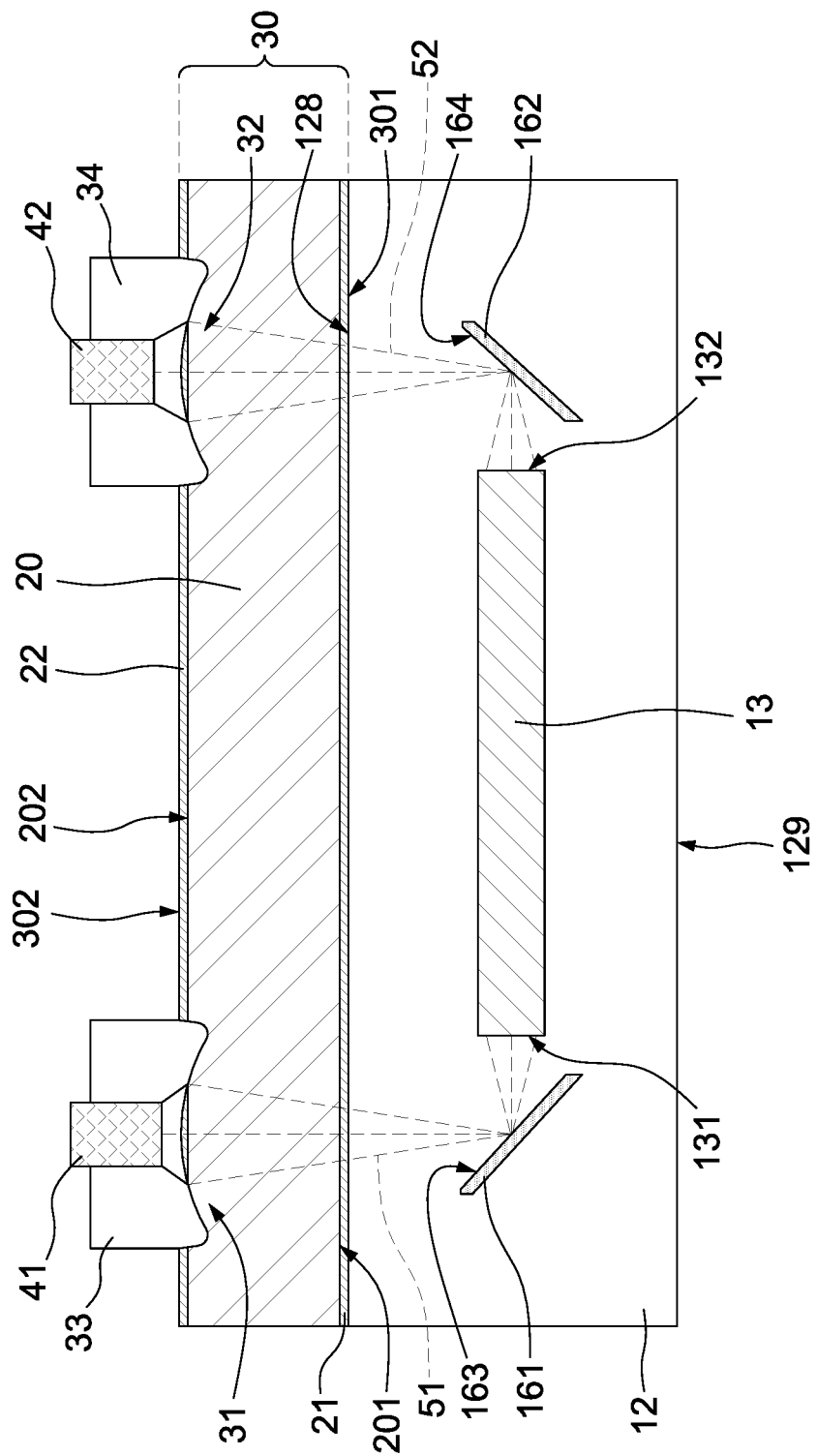
FIG. 2 is a schematic cross-sectional diagram of a semiconductor structure in accordance with some embodiments of the disclosure.

Referring to FIG. 2, the optical signal is indicated by dashed lines. One of the fibers 41 and 42 is for transmission of an input signal, and the other of the fibers 41 and 42 is for transmission of an output signal. In some embodiments, the optical signal 51 emitted from the fiber 41 is focused by the micro-lens 31 onto the optical reflective layer 161. In some embodiments, the optical signal 51 is scattered after being reflected by the optical reflective layer 161. In some embodiments, a beam size of the optical signal 51 on the sidewall 131 is designed and controlled to be substantially equal to or less than the diameter of the fiber 41. In some embodiments, the beam size of the optical signal 51 on the sidewall 131 is substantially equal to or less than 9.2 μm. In some embodiments, the optical signal 51 is travels in the optical guiding layer 13 and is reflected by the optical reflective layer 162 toward the fiber 42. The optical signal 51 represent an input signal, and an optical signal 52 represent an output signal. The optical signal 52 may be focused by the micro-lens 32 to have a beam size substantially equal to or less than 9.2 μm before entering the fiber 42. However, in other embodiments, the optical signal 52 represents an input signal, and the optical signal 51 represents an output signal. A direction of transmission of an optical signal is not limited herein.

Figure 3:
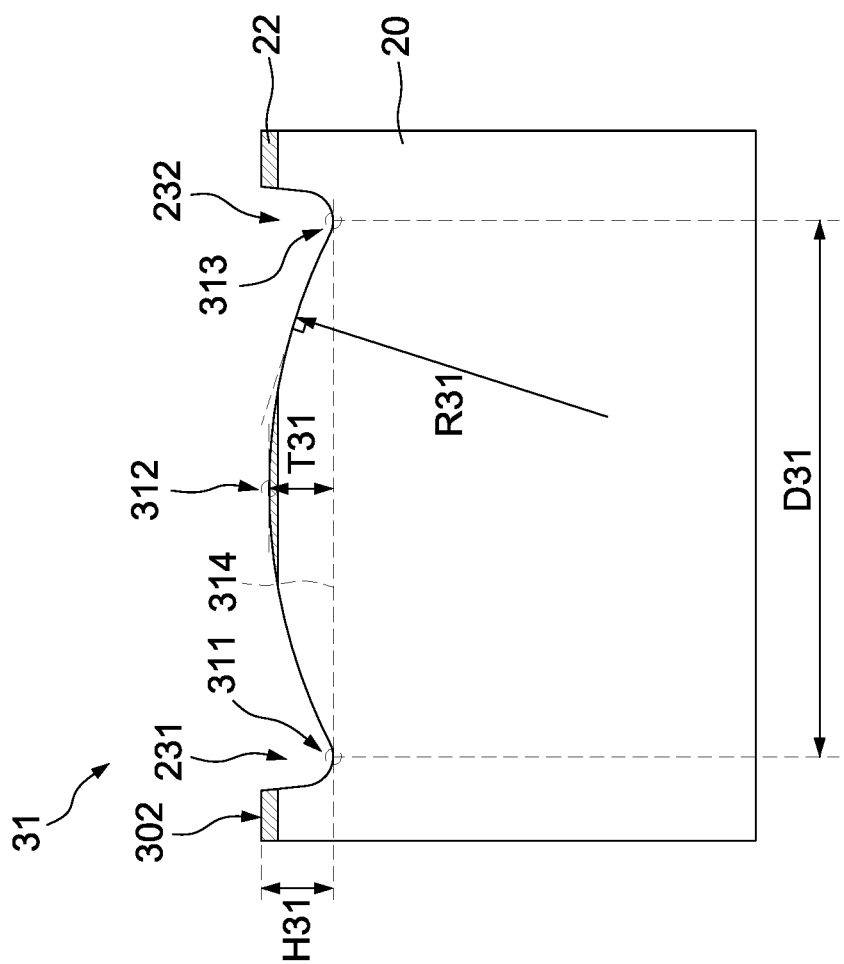
FIG. 3 is a schematic cross-sectional diagram of a microlens of a semiconductor structure in accordance with some embodiments of the disclosure.

FIG. 3 is an enlarged diagram of the micro-lens 31 of the semiconductor structure 100 shown in FIG. 1 in accordance with some embodiments of the present disclosure. A bottom of a first recess 231 indented from or formed in the second surface 302 of the substrate 30 defines a first edge 311 (indicated in a dotted circle) of the micro-lens 31. A bottom of a second recess 232 indented from or formed in the second surface 302 of the substrate 30 defines a second edge 313 (indicated in a dotted circle) of the micro-lens 31. In some embodiments, a top 312 (indicated in a dotted circle) is disposed between the first edge 311 and the second edge 313. In some embodiments, a horizontal distance between the first edge 311 and the top 312 is substantially equal to a horizontal distance between the second edge 313 and the top 312. In some embodiments, a thickness T31 of the micro-lens 31 is in a range of 1 to 100 μm, wherein the thickness T31 is measured between the top 312 and a horizontal level 314 (indicated by a horizontal dashed line) of a lower one of the first edge 311 and the second edge 313. In some embodiments, the edges 311 and 313 are at a same horizontal elevation, and a straight line between the edges 311 and 312 defines the horizontal level 314. In some embodiments, the thickness T31 of the micro-lens 31 is greater than 20 μm. In some embodiments, the thickness T31 of the micro-lens 31 is less than a depth H31 between the top surface 302 of the substrate 30 and the horizontal level 313. In other words, the top 312 is lower than the top surface 302 of the semiconductive layer 20. In some embodiments, the micro-lens 31 includes a portion of the ARC layer 22, as shown in FIG. 3. In some embodiments, an entirety of the micro-lens 31 is a portion of the semiconductive layer 20.

A diameter D31 of the micro-lens 31 is designed to be greater than the diameter of the fiber in order to receive the optical signal, which may be scattered before entering the micro-lens 31. In some embodiments, the diameter D31 of the micro-lens 31 is large enough to overcome a fiber shift offset. In some embodiments, the diameter D31 of the micro-lens 31 is in a range of 10 to 200 μm, wherein the diameter D31 is measured from the first edge 311 to the second edge 313 along the horizontal level 314. In some embodiments, the diameter D31 is greater than 20 μm. In some embodiments, a curvature radius R31 of the micro-lens 31 is in a range of 100 to 500 μm. In some embodiments, the curvature radius R31 is greater than 240 μm. In some embodiments, the curvature radius R31 is consistent across a top surface of the micro-lens 31. In some embodiments, the curvature radius R31 varies at different locations along the top surface of the micro-lens 31. It should be noted that characteristics of the micro-lens 32 can be similar to or same as characteristics of the micro-lens 31 described above. Repeated description is omitted herein.

Referring back to FIG. 1. The semiconductor structure 100 may further include gel materials 33 and 34. In some embodiments, the gel material 33 fills a space between the micro-lens 31 and the fiber 41, and the gel material 33 fills a space between the micro-lens 32 and the fiber 42. More specifically, the gel material 33 may fill the first recess 231 and the second recess 232 shown in FIG. 3. Similarly, the gel material 34 may fill recesses of the substrate 30 defining the micro-lens 32. The gel materials 33 and 34 are configured to fix the fibers 41 and 42 in positions and orientations relative to the optical reflective layers 161 and 162, respectively. In some embodiments, an angle between a central line 411 of the fiber 41 disposed in the gel material 33 and the first direction (or the vertical direction) is in a range of 0 to 15 degrees. In some embodiments, the fiber 41 in the gel material 33 extends along the first direction (or the vertical direction). In some embodiments, the angle between the central line 411 and the first direction is 0 degrees. A distance 55 between the fiber 41 and the micro-lens 31 may be defined by the gel material 33. In some embodiments, the distance 55 is measured from an end of the fiber 41 to the top 312 of the micro-lens 31 shown in FIG. 3. In some embodiments, the distance 55 is adjustable according to a focal length of the micro-lens 31.

Similarly, in some embodiments, an angle between a central line 421 of the fiber 42 disposed in the gel material 34 and the first direction (or the vertical direction) is in a range of 0 to 15 degrees. In some embodiments, the fiber 42 in the gel material 34 extends along the first direction (or the vertical direction). In some embodiments, the angle between the central line 421 and the first direction is 0 degrees. A distance 56 between the fiber 42 and the micro-lens 32 may be defined by the gel material 34. In some embodiments, the distance 56 is measured from an end of the fiber 42 to a top of the micro-lens 32. In some embodiments, the distance 56 is adjustable according to a focal length of the micro-lens 32. In some embodiments, the distance 56 is substantially equal to the distance 55. In some embodiments, the distance 56 is different from the distance 55.

The present disclosure provides a novel semiconductor structure applied in an optical I/O device. The semiconductor structure of the present disclosure includes a vertically-arranged edge coupler. A conventional edge coupler requires a fiber to be disposed horizontally adjacent to the coupler, wherein an optical signal enters the coupler from a lateral edge of the coupler. Due to ongoing size reduction in advanced generations of semiconductor devices, it is difficult to reduce a size of a semiconductor device if a conventional edge coupler is applied. The present disclosure provides a mirror structure to change a transmitting direction of an optical signal emitted from a fiber, and thus a relative position of the fiber to a coupler can be adjusted. In the embodiments of the present disclosure described above, the fiber is disposed vertically above the coupler, and thus a size of a device can be minimized. A lens structure is disposed between the fiber and the mirror structure to focus the optical signal emitted from the fiber, and an issue of signal loss in the conventional edge coupler during transmission can also be minimized. A combination of the lens structure and the mirror structure can therefore provide improved coupling efficiency, high-speed optical transmission and high data rate. In addition, the fiber is disposed vertically over the substrate and can be fixed thereover prior to a dicing operation, which may be performed after the method illustrated above, and thus wafer-scale testing and wafer-scale packaging can be achieved. Costs of the testing and packaging can be reduced compared to those of traditional edge couplers.

A method of manufacturing a semiconductor structure including a mirror structure is also provided in the disclosure. In order to further illustrate concepts of the present disclosure, various embodiments are provided below. For a purpose of clarity and simplicity, reference numbers of elements with same or similar functions are repeated in different embodiments. However, such usage is not intended to limit the present disclosure to specific embodiments or specific elements. In addition, conditions or parameters illustrated in different embodiments can be combined or modified to have different combinations of embodiments as long as the parameters or conditions used are not conflicted.

Figure 4:
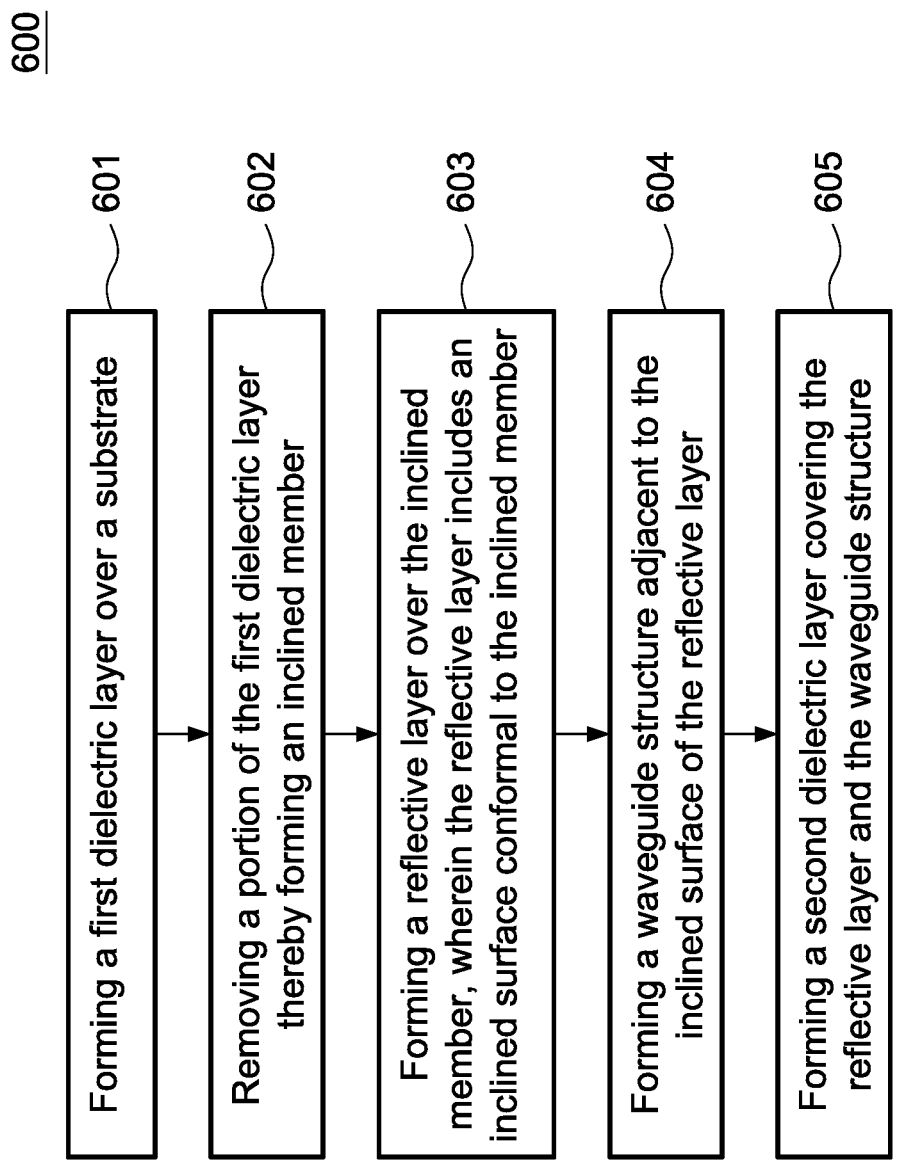
FIG. 4 is a flow diagram of a method of manufacturing a semiconductor structure in accordance with some embodiments of the disclosure.

FIG. 4 is a flow diagram of a method 600 for manufacturing a semiconductor structure in accordance with some embodiments of the present disclosure. The method 600 includes a number of operations (601, 602, 603, 604 and 605) and the description and illustration are not deemed as a limitation to the sequence of the operations. A first dielectric layer is formed over a substrate in the operation 601. A portion of the first dielectric layer is removed in the operation 602, thereby forming an inclined member. A reflective layer is formed over the inclined member in the operation 603, wherein the reflective layer includes an inclined surface conformal to the inclined member. A waveguide structure is formed adjacent to the inclined surface of the reflective layer in the operation 604. A second dielectric layer covering the reflective layer and the waveguide structure is formed in the operation 605. It should be noted that the operations of the method 600 may be rearranged or otherwise modified within the scope of the various aspects. Additional processes may be provided before, during, and after the method 600, and some other processes may be only briefly described herein. Thus, other implementations are possible within the scope of the various aspects described herein.

Figure 5:
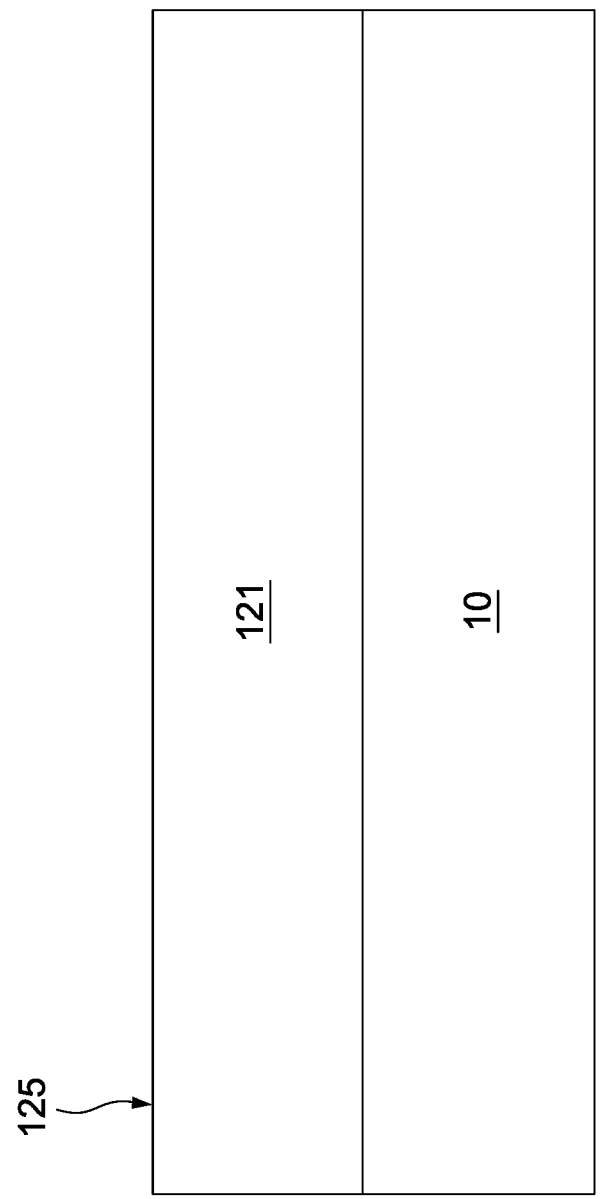
FIGS. 5 to 20 are schematic cross-sectional diagrams of a semiconductor structure at different stages of a manufacturing method in accordance with some embodiments of the disclosure.

Referring to FIG. 5, which is a schematic cross-sectional diagram of a semiconductor structure at a stage of the method 600 in accordance with some embodiments of the present disclosure. In the operation 601, a dielectric sub-layer 121 is formed over a substrate 10. In some embodiments, the substrate 10 is provided or received. In some embodiments, the substrate 10 is a wafer, a silicon substrate, a bulk substrate, a supporting substrate, a semiconductor substrate or a combination thereof. In some embodiments, the substrate 10 is a bulk substrate including polysilicon and/or single crystalline silicon. In some embodiments, the substrate 10 is a semiconductor substrate having electrical components and/or electrical devices formed therein or thereon. The dielectric sub-layer 121 may be formed by a deposition operation. In some embodiments, the deposition operation includes a chemical vapor deposition (CVD), a physical vapor deposition (PVD), a liquid-phase deposition (LPD), an atmospheric-pressure CVD (APCVD), an atomic layer deposition (ALD), a sub-atmospheric CVD (SACVD), a low-pressure chemical vapor deposition (LPCVD), a plasma-enhanced CVD (PECVD), or a combination thereof. In some embodiments, the dielectric sub-layer 121 includes oxide, spin-on-glass (SOG), borophosphosilicate glass (BPSG), or a combination thereof. In some embodiments, the dielectric sub-layer 121 includes silicon oxide. In some embodiments, a thickness of the dielectric sub-layer 121 is in a range of 5 to 30 μm. In some embodiments, the thickness of the dielectric sub-layer 121 is in a range of 5 to 15 μm.

Figure 6:
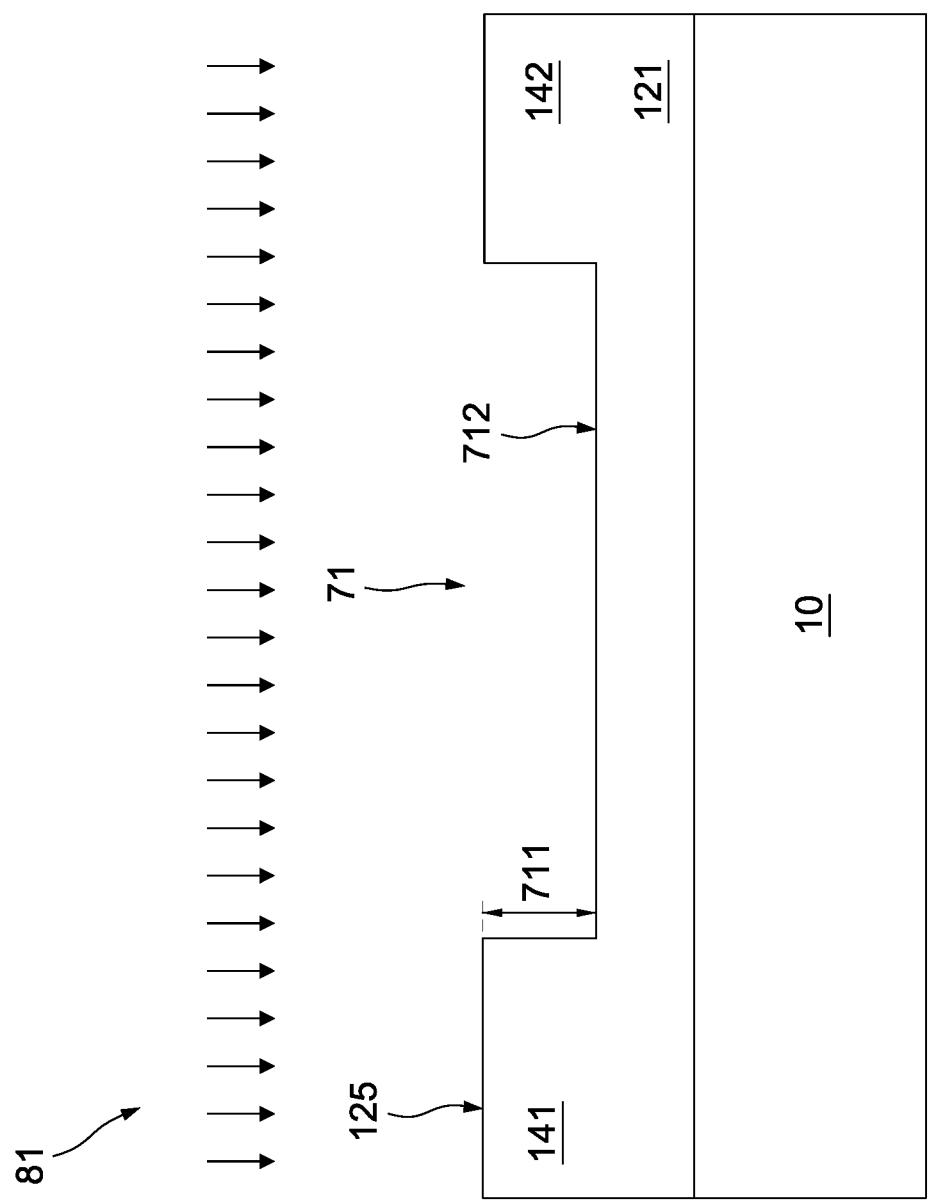

Referring to FIG. 6, which is a schematic cross-sectional diagram of a semiconductor structure at a stage of the method 600 in accordance with some embodiments of the present disclosure. In the operation 602, a portion of the dielectric sub-layer 121 is removed. In some embodiments, a patterning operation 81 is performed on the dielectric sub-layer 121. In some embodiments, a recess 71 is formed in a top surface 125 of the dielectric sub-layer 121 by the patterning operation. In some embodiments, a photoresist layer (not shown) is formed over the dielectric sub-layer 121 to define a position of the recess 71, and the photoresist layer is removed after the patterning operation. In some embodiments, the patterning operation includes a time-mode etching operation. In some embodiments, the time-mode etching operation includes a dry etching, a wet etching, or a combination thereof. In some embodiments, the dry etching, the wet etching or the combination thereof is performed for a certain duration of time in order to control a depth 711 of the recess 71, which is measured from the top surface 125 of the dielectric sub-layer to a bottom surface 712 of the recess 71.

In some embodiments, the dry etching operation includes an ion beam etching (IBE), a reactive ion etching (RIE), a directional plasma etching, or a combination thereof. In some embodiments, the wet etching includes a selective wet etching having a high selectivity to oxide. In some embodiments, the selective wet etching has a high selectivity to silicon oxide. The recess 71 may be defined by a protruding member 141 and a protruding member 142 of the dielectric sub-layer 121. In some embodiments, a height of the protruding member 141 is substantially equal to a height of the protruding member 142. In some embodiments, a height of the protruding member 141 or the protruding member 142 is substantially equal to the depth 711. In some embodiments, the numeral 711 can also represent the height of the protruding member 141 or the protruding member 142.

Figure 7:
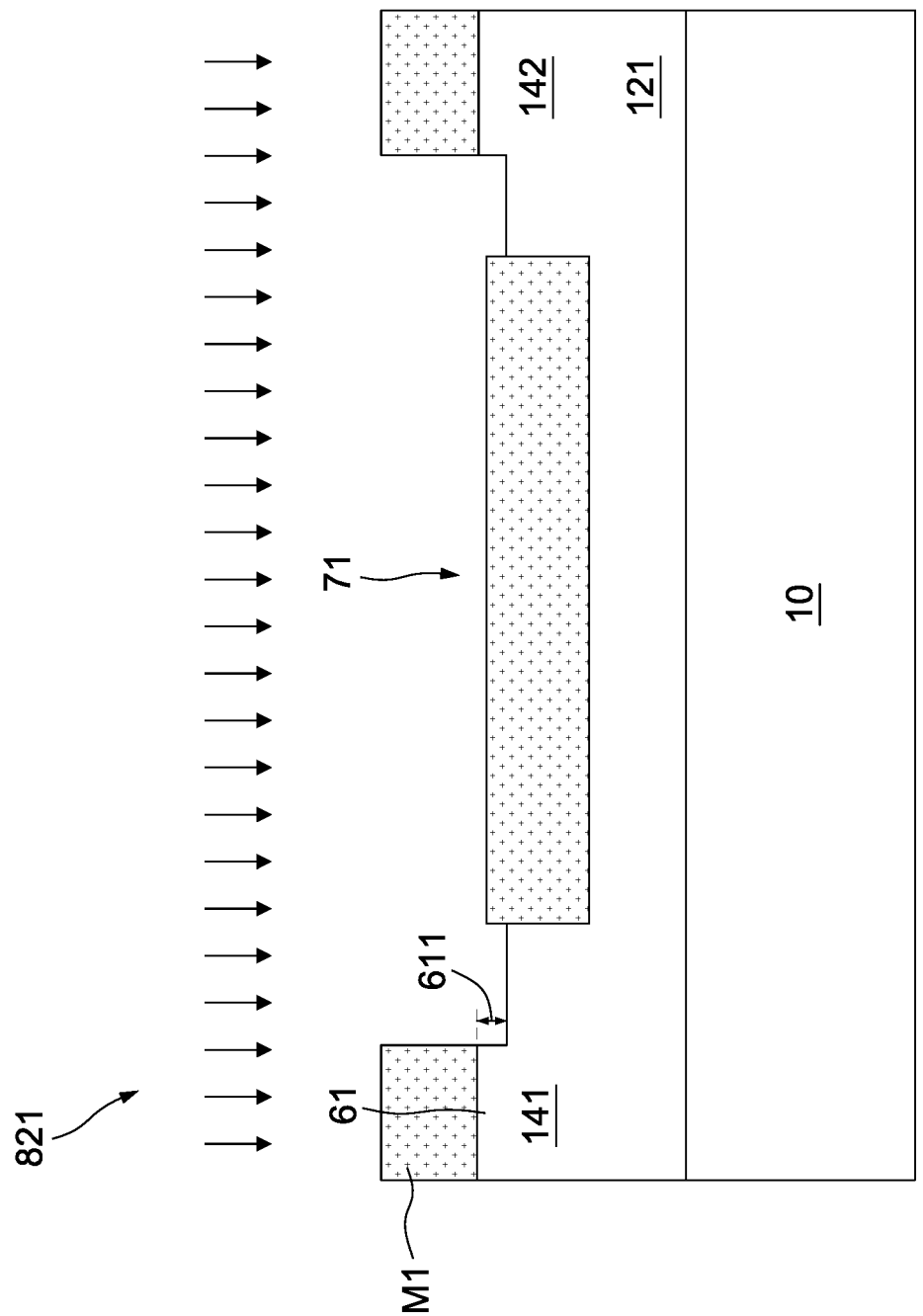
Figure 8:
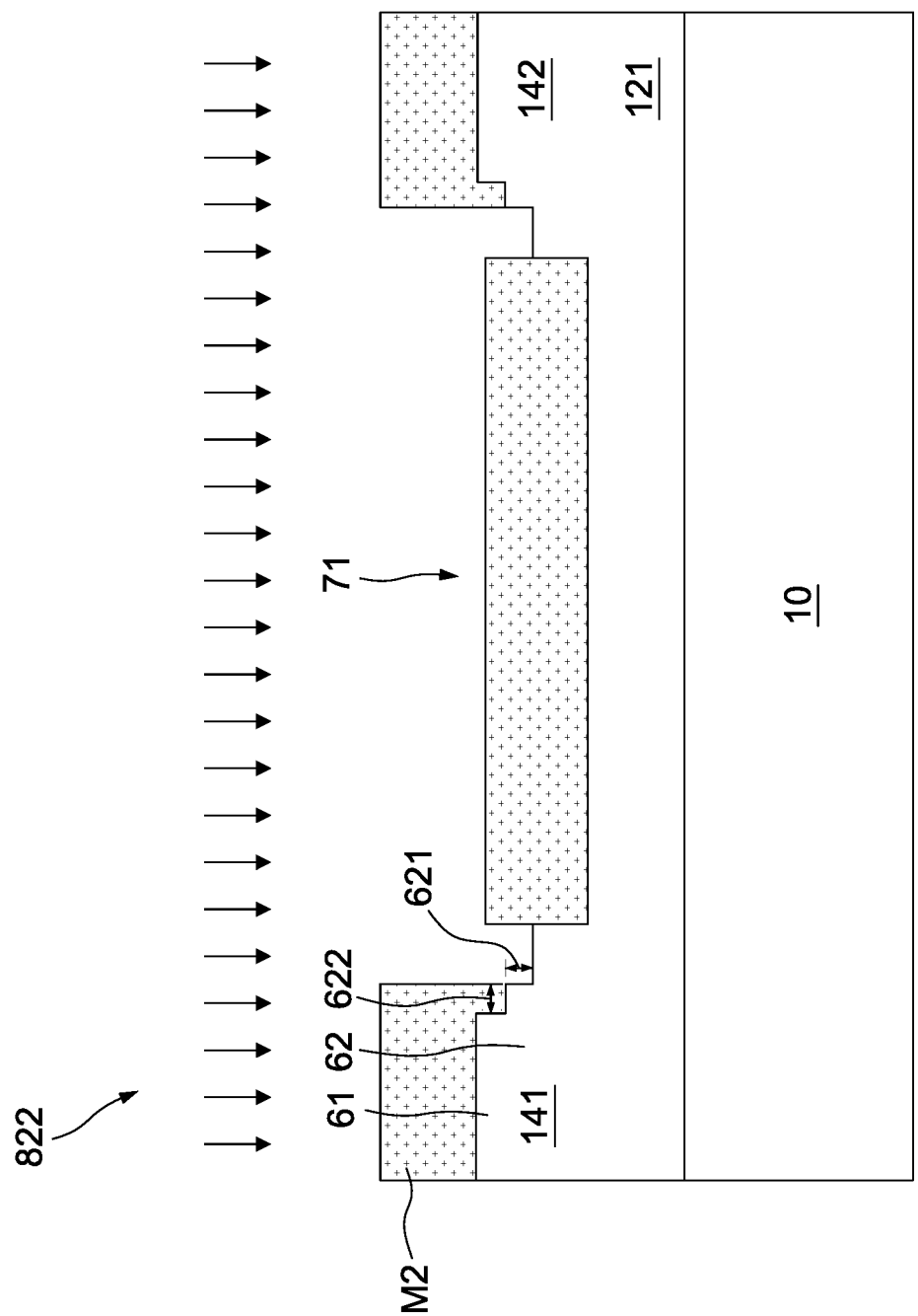
Figure 9:
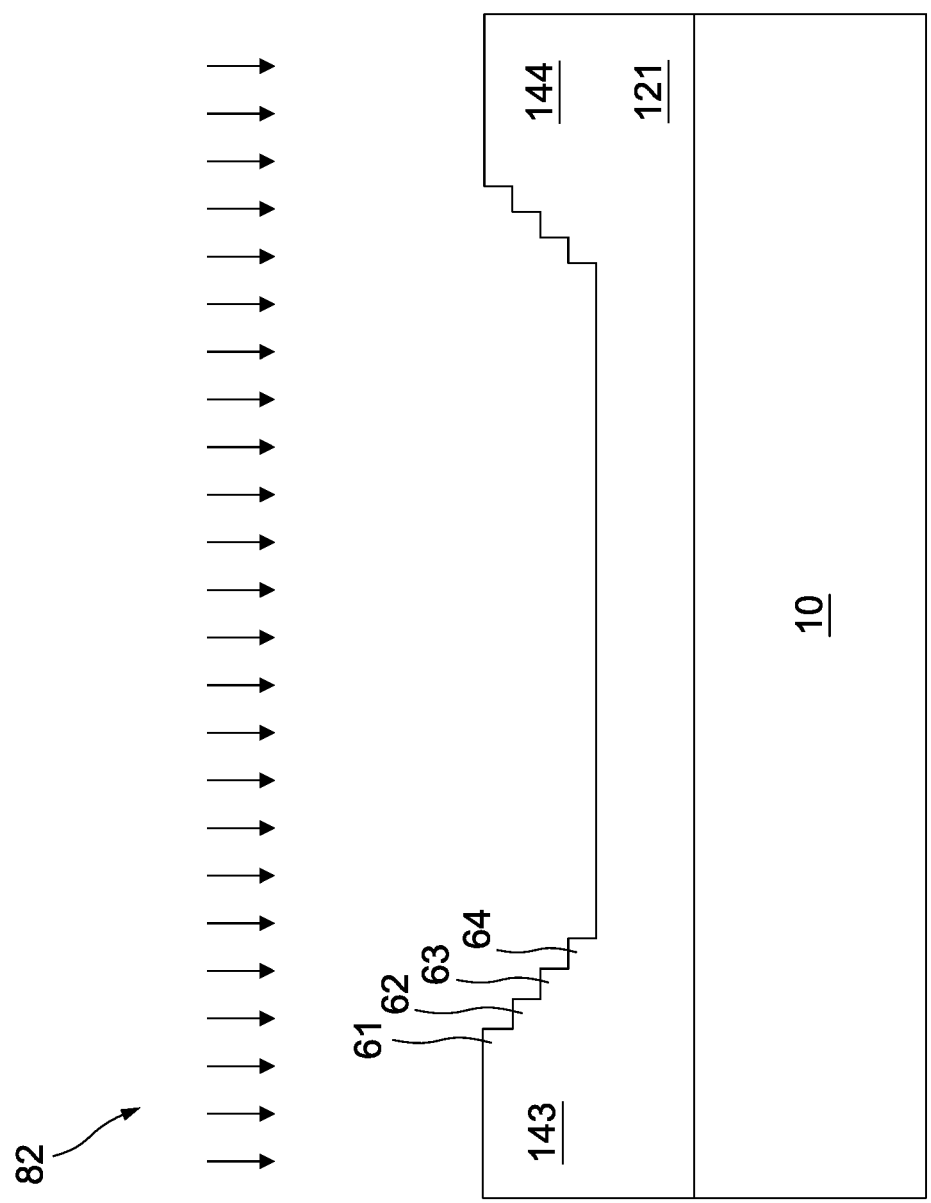

Referring to FIGS. 7 to 9, which are schematic cross-sectional diagrams of a semiconductor structure at different stages of the method 600 in accordance with some embodiments of the present disclosure. In the operation 602, after the formation of the protruding members 141 and 142, another patterning operation 82 shown in FIG. 9 is performed on the protruding members 141 and 142 to form a stepped member 143 and a stepped member 144. In some embodiments, each of the stepped member 143 and the stepped member 144 has a stair configuration.

In some embodiments, the patterning operation 82 includes multiple etching operations as shown in FIGS. 7 and 8. In some embodiments, a mask layer M1 is formed over the dielectric sub-layer 121 as shown in FIG. 7. In some embodiments, the mask layer M1 covers the recess 71, a portion of the protruding member 141 and a portion of the protruding member 142. In some embodiments, the mask layer M1 includes a hard material, a dielectric material different from that of the dielectric sub-layer 121, a photoresist material, or a combination thereof. In some embodiments, an etching operation 821 is performed on portions of the protruding members 141 and 142 exposed through the mask layer M1. In some embodiments, a first step 61 having a depth 611 is formed by the etching operation 821. In some embodiments, the etching operation 821 includes a time-mode etching operation. In some embodiments, the time-mode etching operation includes a dry etching, a wet etching or a combination thereof.

In some embodiments, the time-mode etching operation is performed for a certain duration of time in order to control the depth 611 of the first step 61. In some embodiments, the dry etching operation includes an ion beam etching (IBE), a reactive ion etching (RIE), a directional plasma etching, or a combination thereof. In some embodiments, the wet etching includes a selective wet etching having a high selectivity to oxide. In some embodiments, the duration of the etching operation 821 is less than a duration of the patterning operation 81, and thus the depth 611 of the first step 61 of the protruding member 141 is less than the depth 711 of the recess 71 shown in FIG. 6. In some embodiments, the etching operation 821 has a high selectivity to the dielectric sub-layer 121 and a low selectivity to the mask layer M1. In some embodiments, an etching rate of the patterning operation 81 is greater than an etching rate of the etching operation 821. The mask layer M1 may be removed after the etching operation 821.

In some embodiments, a mask layer M2 is formed over the dielectric sub-layer 121 after the removal of the mask layer M1, as shown in FIG. 8. In some embodiments, the mask layer M2 covers the recess 71, the first step 61 of the protruding member 141, and a symmetrical portion of the protruding member 142. In some embodiments, the mask layer M2 covers a portion of the protruding member 141 outside the first step 61 by a length 622, which defines a size of a tread of a second step 62 to be formed. An etching operation 822 is performed on the dielectric sub-layer 121 for a certain duration of time, and the second step 62 is thereby formed. The mask layer M2 may be similar to the mask layer M1, and the etching operation 822 may be similar to the etching operation 821. Repeated description is omitted herein; however, such omission is not intended to limit the present disclosure. In some embodiments, the duration of the etching operation 822 is substantially equal to the duration of the etching operation 821, and thus the depth 611 of the first step 61 is substantially equal to a depth 621 of the second step 62 shown in FIG. 8. In some embodiments, the depth 621 is controlled to be substantially equal to the length 622. In other embodiments, the depth 621 is controlled to be different from the length 622 depending on a designed slope of an inclined surface to be formed in later processing. The mask layer M2 may be removed after the etching operation 822.

Operations similar to those shown in FIGS. 7 and 8 may be repeated to form the stepped member 143 and the stepped member 144 as shown in FIG. 9. A number of repetition of the operations depends on a number of steps of the stepped members 143 and 144 to be formed. In some embodiments as shown in FIG. 9, each of the stepped members 143 and 144 includes four steps (e.g., 61, 62, 63 and 64 of the stepped member 143). However, the number of steps of the stepped member 143 or 144 is not limited herein.

It should be noted that the description above focuses on the formation of the first step 61 and the second step 62 of the protruding member 141 only. However, as shown in FIGS. 7 to 9, it can be understood that formation of steps of the protruding member 142 is similar to the formation of the steps of the protruding member 141. In some embodiments, the steps of the protruding member 142 are formed simultaneously with the formation of the corresponding steps of the protruding member 141. In some embodiments, the steps of the protruding member 142 are symmetrical to the steps of the protruding member 141 with respect to the recess 71. In some embodiments, the steps of the protruding member 142 are similar to and unsymmetrical to the steps of the protruding member 141 with respect to the recess 71. Repeated description is omitted herein for a purpose of brevity.

Figure 10:
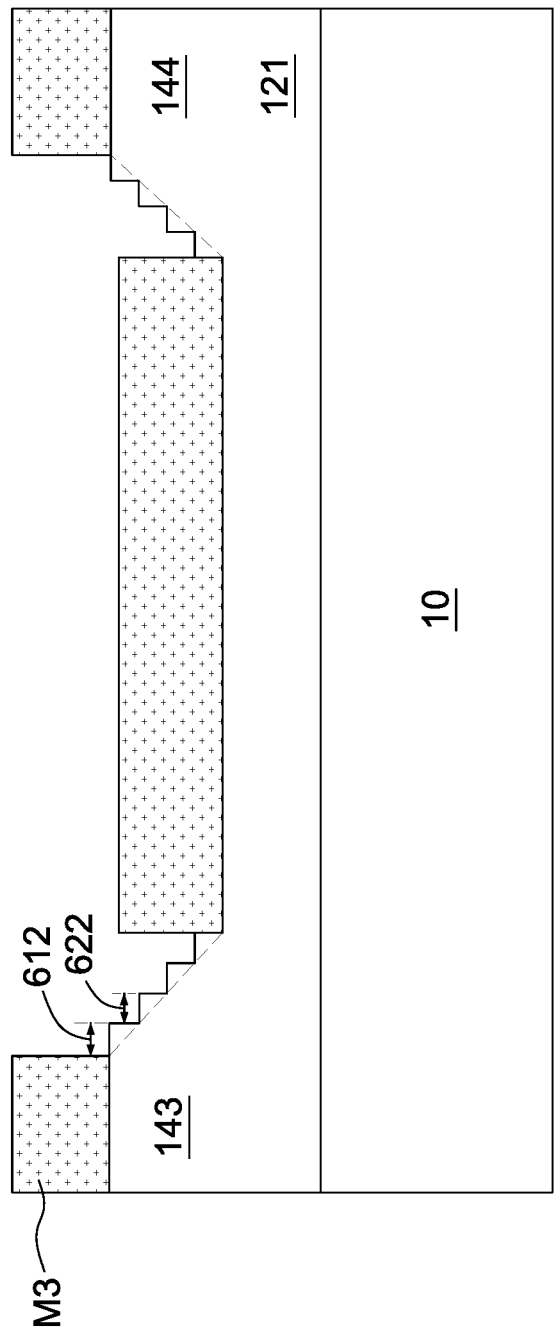

Referring to FIG. 10, which is a schematic cross-sectional diagram of a semiconductor structure at a stage of the method 600 in accordance with some embodiments of the present disclosure. In the operation 602, after the formation of the stepped members 143 and 144, a mask layer M3 is formed over the stepped members 143 and 144 and the recess 71 (as shown in FIG. 6). In some embodiments, treads of the steps 61, 62, 63 and 64 are exposed through the mask layer M3. A sidewall of the mask layer M3 may be offset from a sidewall of the first step 61, and thus a length 612 of the tread of the first step 61 can be defined. In some embodiments, the length 612 of the tread of the first step 61 is substantially equal to the length 622 of the tread of the second step 62. However, the disclosure is not limited thereto. A ratio of a height of a riser of a step to a length of a tread of the step can determine a slope of an inclined surface to be formed in later processing.

Figure 11:
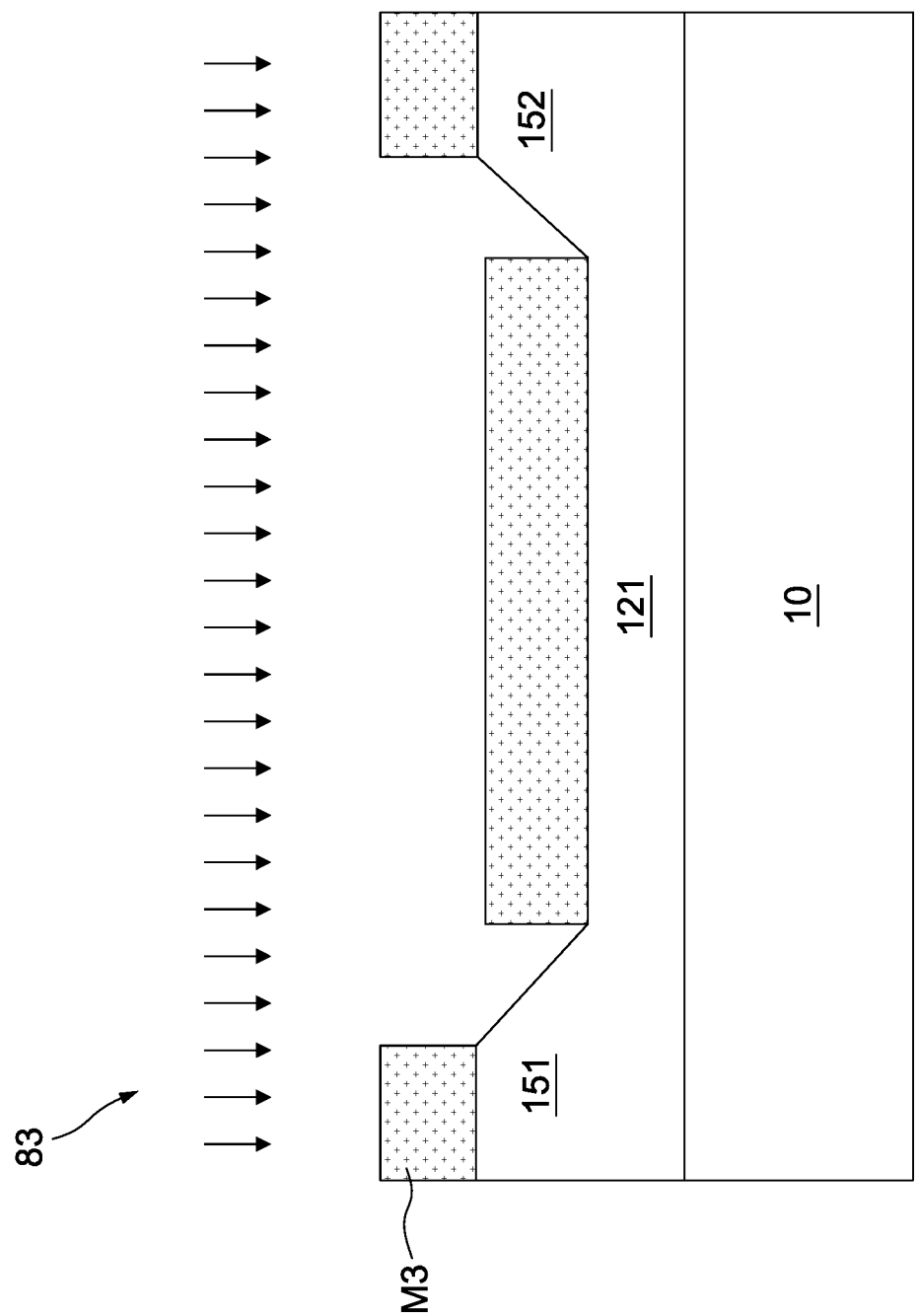

Referring to FIG. 11, which is a schematic cross-sectional diagram of a semiconductor structure at a stage of the method 600 in accordance with some embodiments of the present disclosure. In the operation 602, after the formation of the mask layer M3, an etching operation 83 is performed on the steps of the stepped members 143 and 144 shown in FIG. 10 of the dielectric sub-layer 121, and an inclined member 151 and an inclined member 152 are thereby formed. In some embodiments, the etching operation 83 includes a wet etching operation. In some embodiments, portions of the stepped members 143 and 144 are removed by the etching operation 83, and the etching operation 83 is controlled and stops at dashed lines shown in FIG. 10, thereby forming the inclined members 151 and 152 as shown in FIG. 11. In some embodiments, an entirety of the treads of the steps 61 to 64 are removed by the etching operation 83.

Figure 12:
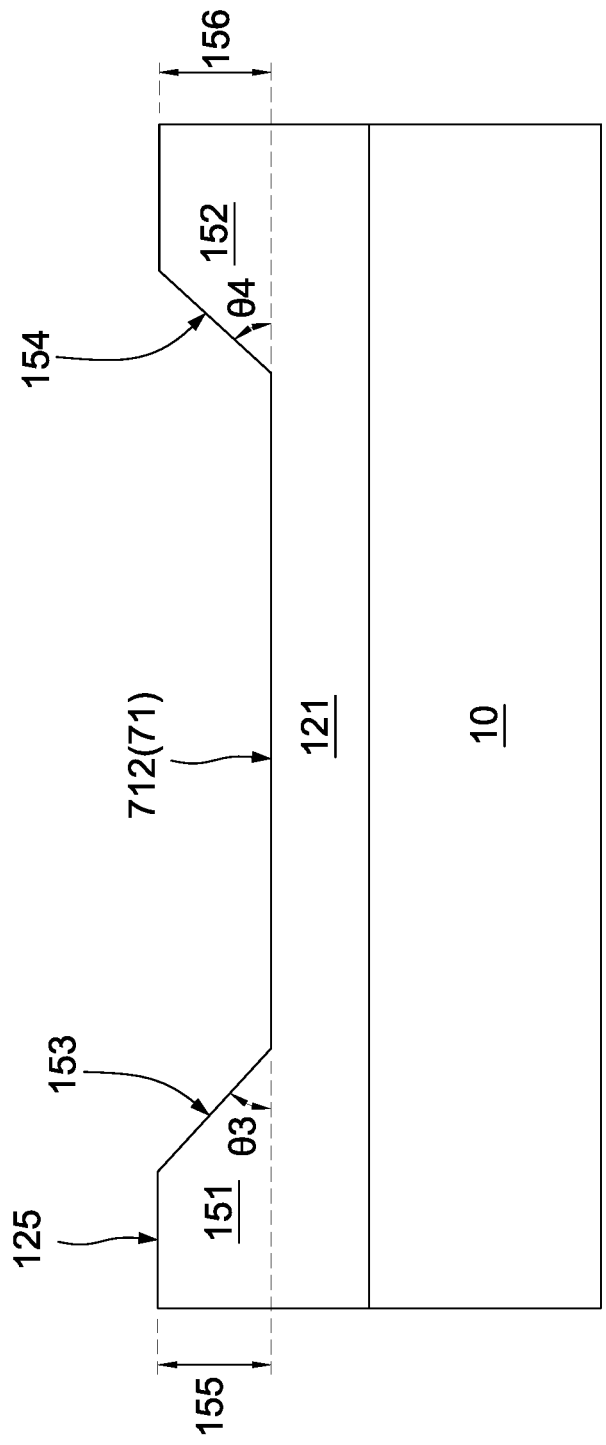

Referring to FIG. 12, which is a schematic cross-sectional diagram of a semiconductor structure at a stage of the method 600 in accordance with some embodiments of the present disclosure. After the formation of the inclined members 151 and 152, the mask layer M3 is removed. In some embodiments, the inclined member 151 includes an inclined surface 153 having an elevation angle θ3. In some embodiments, the inclined surface 153 connects the top surface 125 of the dielectric sub-layer 121 to the bottom surface 712 of the recess 71. In some embodiments, the inclined member 152 includes an inclined surface 154 having an elevation angle θ4. In some embodiments, the inclined surface 154 connects the top surface 125 of the dielectric sub-layer 121 to the bottom surface 712 of the recess 71. In some embodiments, the inclined surface 153 and the inclined surface 154 are planar surfaces.

In some embodiments, as illustrated above, a height of a step of the stepped member 143 (shown in FIG. 9) and a length of a tread of the step are substantially equal, and thus the elevation angle θ3 is about 45 degrees. Therefore, a slope (or an elevation angle) of an inclined surface (e.g., the inclined surface 153 or 154) of the dielectric sub-layer 121 can be controllable through the ratio of a height of a riser of a step to a length of a tread of the step of the stepped member (e.g., the stepped member 143 or 144 shown in FIG. 9). In some embodiments, the elevation angles θ3 and θ4 are substantially equal. In some embodiments, the elevation angles θ3 and θ4 are different depending on designed traveling pathways of an input optical signal and an output optical signal. In some embodiments, a height 155 of the inclined member 151 is substantially equal to or greater than 40 μm. In some embodiments, a height 156 of the inclined member 152 is substantially equal to a height of the inclined member 151.

Figure 13:
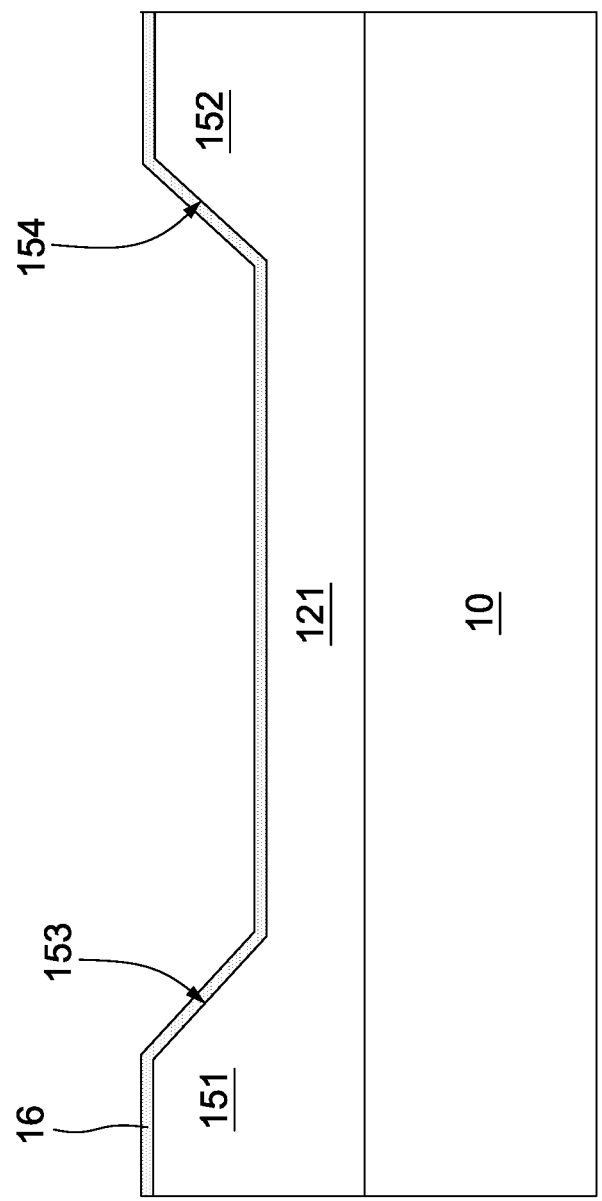

Referring to FIG. 13, which is a schematic cross-sectional diagram of a semiconductor structure at a stage of the method 600 in accordance with some embodiments of the present disclosure. In the operation 603, a reflective layer 16 is formed over the dielectric sub-layer 121. In some embodiments, the reflective layer 16 is conformal to the dielectric sub-layer 121. More specifically, the reflective layer 16 is conformal to the inclined members 151 and 152. In some embodiments, the reflective layer 16 includes copper (Cu), gold (Au), aluminum (Al), titanium nitride (TiN), tantalum nitride (TaN), zinc (Zn), tin (Sn), lead (Pb), magnesium (Mg), or a combination thereof. In some embodiments, the reflective layer 16 is formed by CVD, PVD, a sputtering operation, an electroplating operation, an electroless-plating operation, or a combination thereof. In some embodiments, a thickness of the reflective layer 16 is in a range of 1 to 100 microns (μm).

Figure 14:
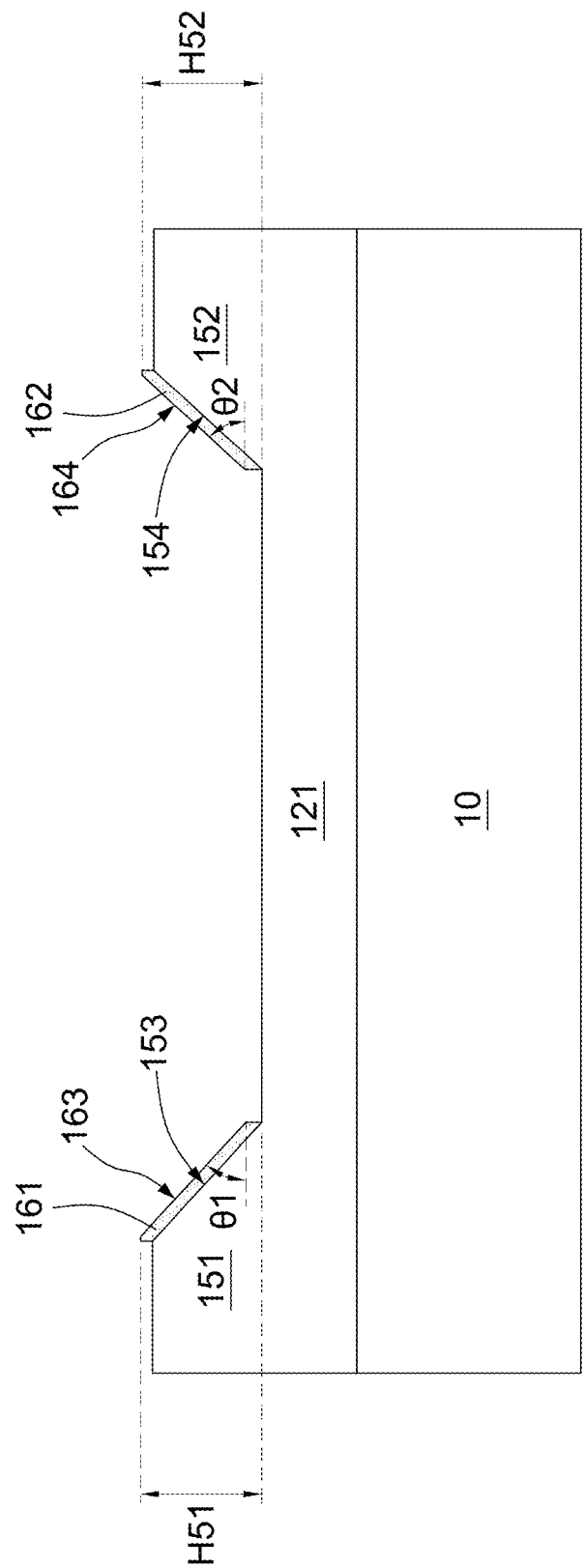

Referring to FIG. 14, which is a schematic cross-sectional diagram of a semiconductor structure at a stage of the method 600 in accordance with some embodiments of the present disclosure. After the formation of the reflective layer 16, a patterning operation is performed to remove horizontal portions of the reflective layer 16. Portions of the reflective layer 16 on the inclined surfaces 153 and 154 are left in place and become an optical reflective layer 161 and an optical reflective layer 162. In some embodiments, the optical reflective layer 161 has an inclined surface 163 facing away from the inclined surface 153 of the inclined member 151. In some embodiments, the inclined surface 163 is a planar surface and has an elevation angle θ1, which is substantially equal to the elevation angle θ3 of the inclined surface 153. In some embodiments, the optical reflective layer 162 has an inclined surface 164 facing away from the inclined surface 154 of the inclined member 152. In some embodiments, the inclined surface 164 is a planar surface and has an elevation angle θ2, which is substantially equal to the elevation angle θ4 of the inclined surface 154. In some embodiments, a height H51 of the optical reflective layer 161 is substantially equal to or greater than the height 155 of the inclined member 151 shown in FIG. 12, wherein the height H51 is a vertical distance between a top and a bottom of the optical reflective layer 161. In some embodiments, a height H52 of the optical reflective layer 162 is substantially equal to or greater than the height 156 of the inclined member 152 shown in FIG. 12, wherein the height H52 is a vertical distance between a top and a bottom of the optical reflective layer 162.

Figure 15:
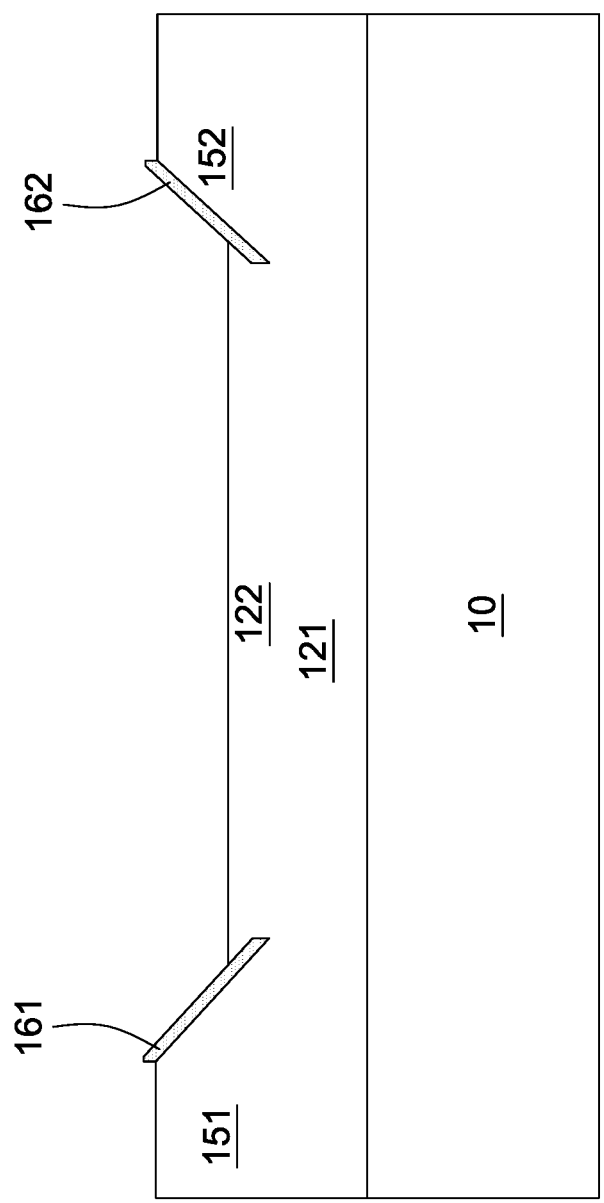

Referring to FIG. 15, which is a schematic cross-sectional diagram of a semiconductor structure at a stage of the method 600 in accordance with some embodiments of the present disclosure. Prior to the operation 604, a dielectric sub-layer 122 is optionally formed in the recess 71 between the optical reflective layers 161 and 162. In some embodiments, the dielectric sub-layer 122 is configured to adjust an elevation of an optical guiding layer 13 to be formed. In some embodiments, the optical guiding layer 13 is to be formed at an elevation between the top and the bottom of the optical reflective layer 161 or 162, and thus the dielectric sub-layer 122 is formed prior to formation of the optical guiding layer 13. In alternative embodiments, the optical guiding layer 13 is to be formed at an elevation same as an elevation of the bottom of the optical reflective layer 161 or 162, and thus the formation of the dielectric sub-layer 122 is omitted.

Figure 16:
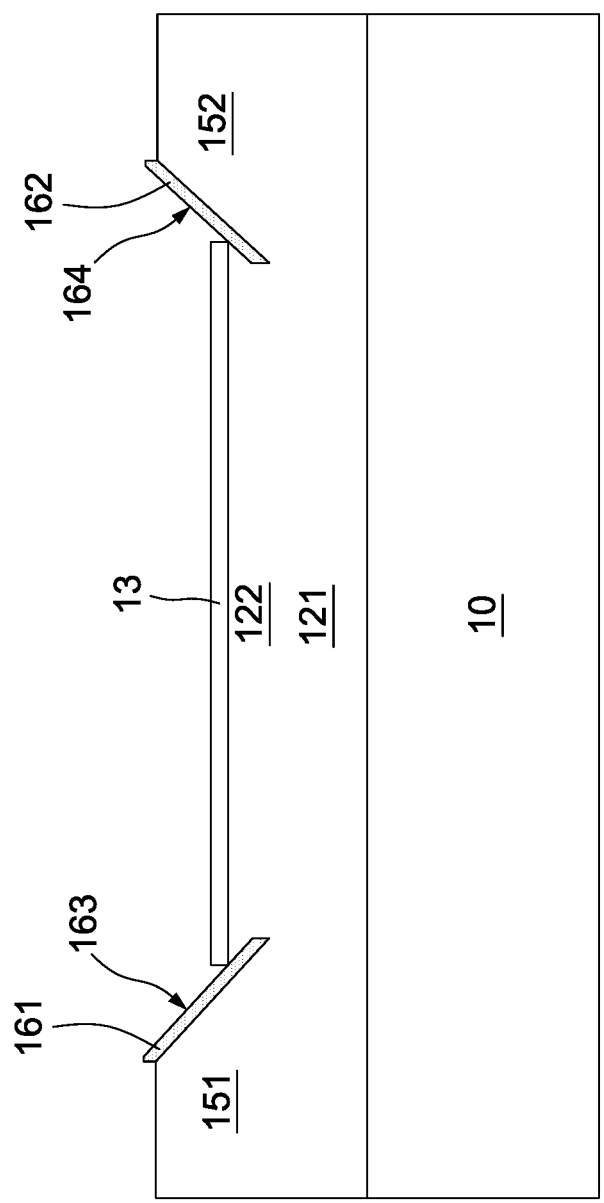

Referring to FIG. 16, which is a schematic cross-sectional diagram of a semiconductor structure at a stage of the method 600 in accordance with some embodiments of the present disclosure. In the operation 604, the optical guiding layer 13 is formed adjacent to the optical reflective layer 161 or 162. In some embodiments, the optical guiding layer 13 is formed between the optical reflective layers 161 and 162. In some embodiments, the formation of the optical guiding layer 13 includes several steps. For example, a guiding layer is formed conformal to the optical reflective layers 161 and 162 and the dielectric sub-layers 121 and 122. The guiding layer may then be patterned, wherein portions of the guiding layer are removed, and a remaining portion of the guiding layer becomes the optical guiding layer 13. In some embodiments, the optical guiding layer 13 is disposed over the dielectric sub-layer 122 in a defined area between the optical reflective layers 161 and 162. In some embodiments, the optical guiding layer 13 contacts the optical reflective layer 161 and/or the optical reflective layer 162, as shown in FIG. 16. In other embodiments, the optical guiding layer 13 is physically separated from the optical reflective layer 161 and/or the optical reflective layer 162, as shown in FIG. 1. In some embodiments, the optical guiding layer 13 may be referred to as a waveguide structure 13.

Figure 17:
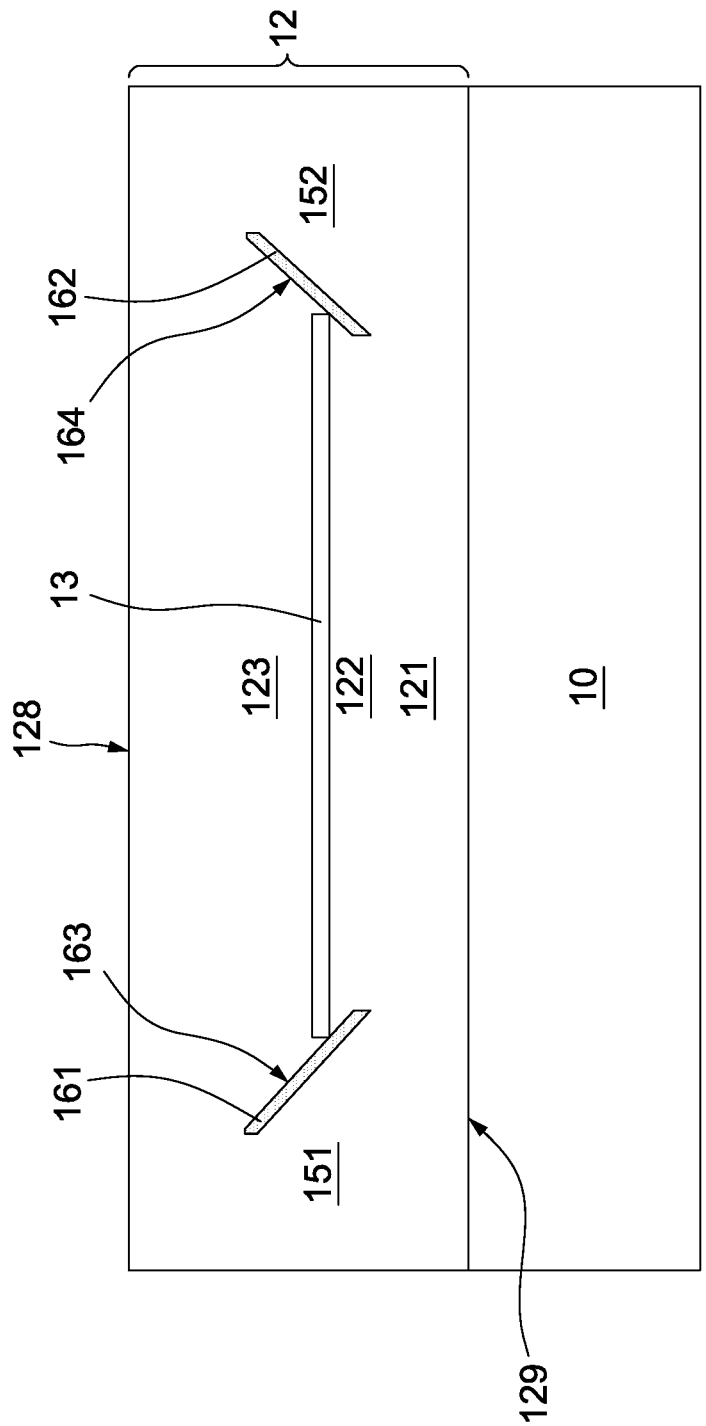

Referring to FIG. 17, which is a schematic cross-sectional diagram of a semiconductor structure at a stage of the method 600 in accordance with some embodiments of the present disclosure. In the operation 605, a dielectric sub-layer 123 is formed to cover the optical guiding layer 13 and the optical reflective layers 161 and 162. Materials of the dielectric sub-layers 121, 122 and 123 may be same, and a boundary or an interface between two of adjacent layers 121, 122 and 123 can be observed. In some embodiments, the dielectric sub-layers 121, 122 and 123 together form a dielectric layer 12. In some embodiments, the dielectric sub-layer 123 covers the tops of the optical reflective layers 161 and 162, and a first surface 128 of the dielectric layer 12 is above the tops of the optical reflective layers 161 and 162. In other embodiments, the tops of the optical reflective layers 161 and 162 and the first surface 128 of the dielectric layer 12 are substantially coplanar.

Figure 18:
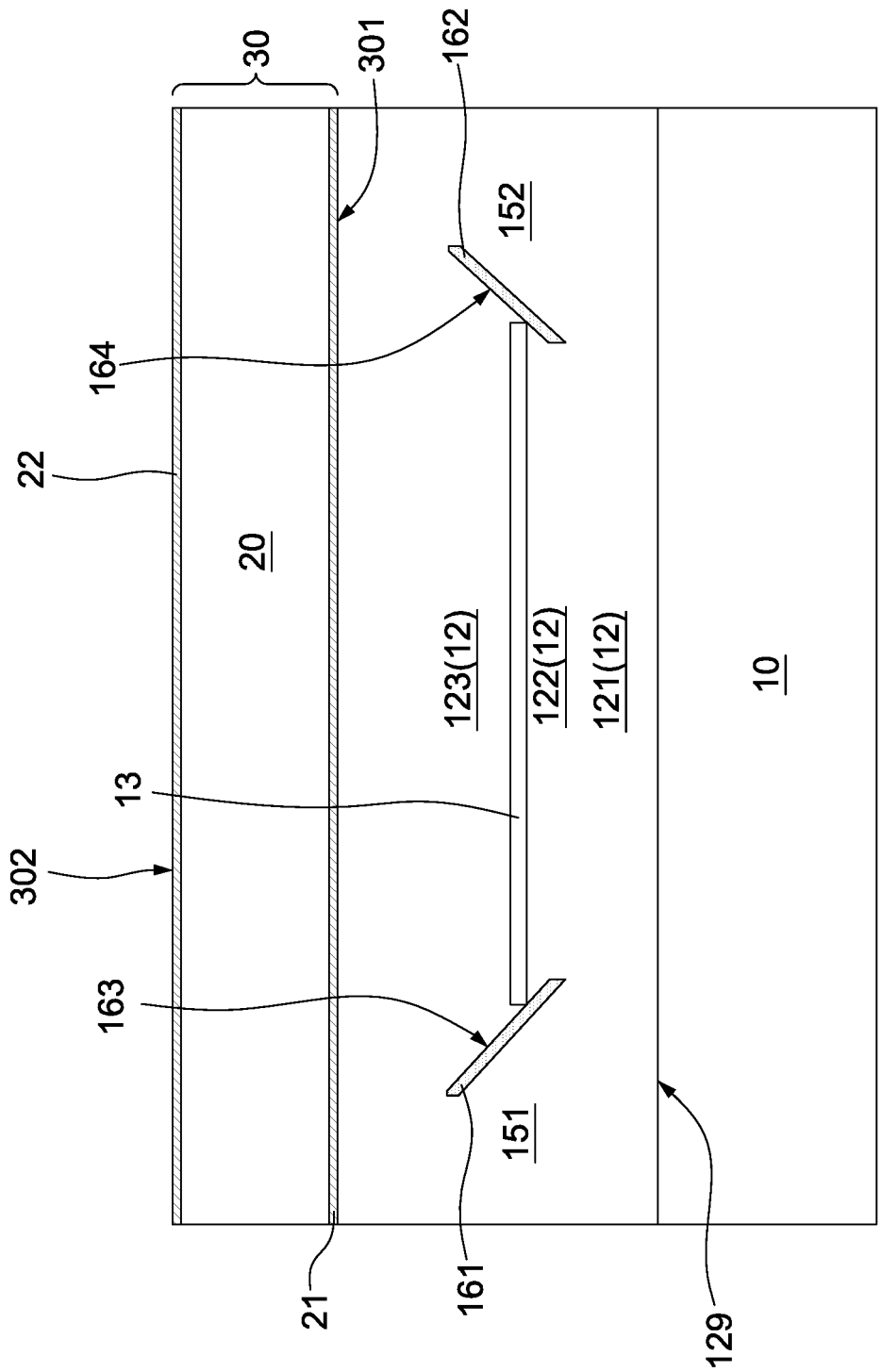

Referring to FIG. 18, which is a schematic cross-sectional diagram of a semiconductor structure at a stage of the method 600 in accordance with some embodiments of the present disclosure. After the operation 605, an ARC layer 21, a semiconductive layer 20 and an ARC layer 22 are sequentially formed on the first surface 128 of the dielectric layer 12. In some embodiments, multiple depositions are performed to form the ARC layer 21, the semiconductive layer 20 and the ARC layer 22. In some embodiments, the semiconductive layer 20 is bonded over the ARC layer 21 after deposition of the ARC layer 21. Other conventional methods can be applied, and detailed description of the formation of the ARC layer 21, the semiconductive layer 20 and the ARC layer 22 is omitted herein. In some embodiments, the ARC layer 21, the semiconductive layer 20 and the ARC layer 22 together define a substrate 30.

Figure 19:
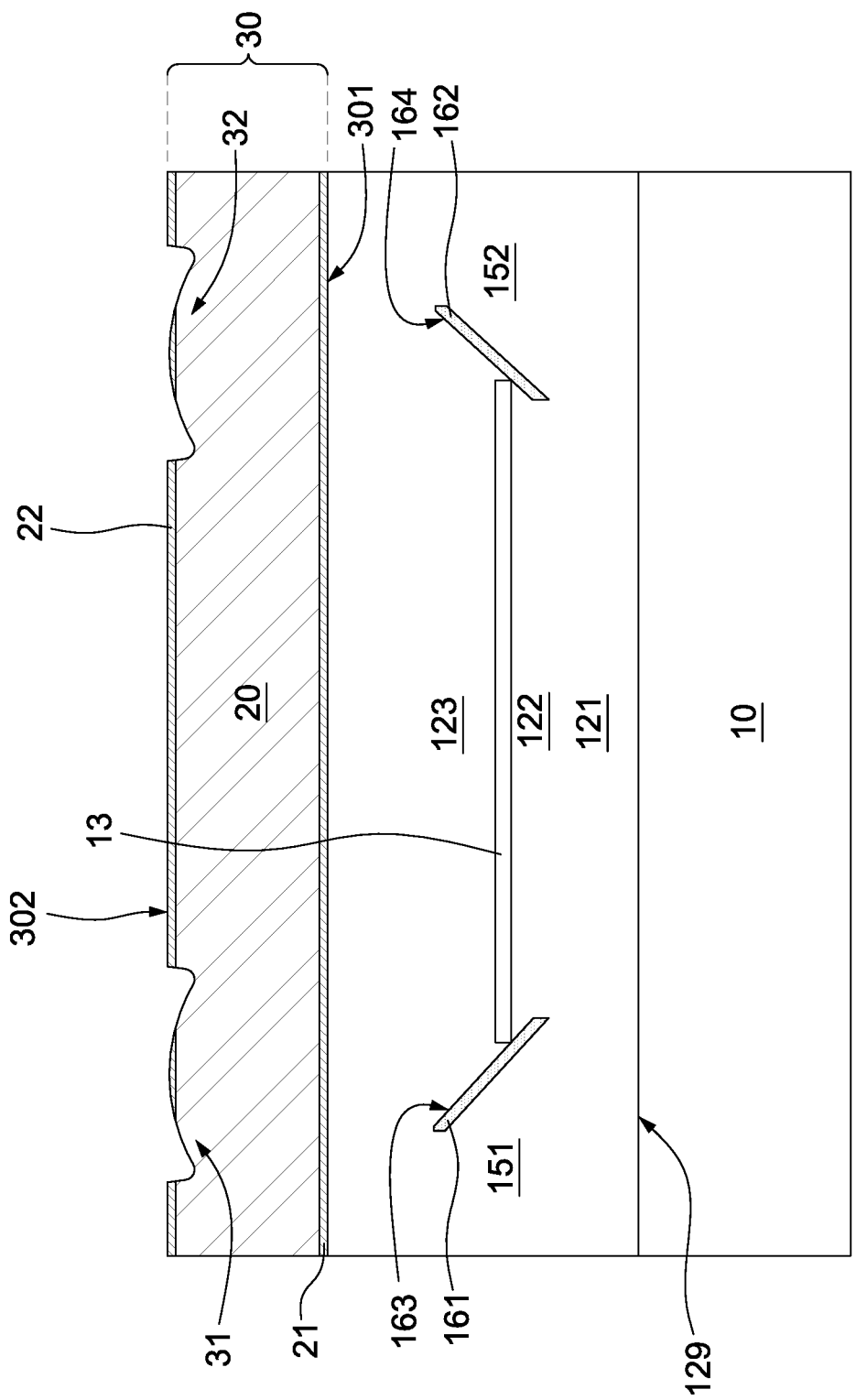

Referring to FIG. 19, which is a schematic cross-sectional diagram of a semiconductor structure at a stage of the method 600 in accordance with some embodiments of the present disclosure. After the formation of the substrate 30, a micro-lens 31 and a micro-lens 32 are formed at a first surface 302 of the substrate 30. In some embodiments, multiple dry etching operations are performed on the first surface 302 of the substrate 30, wherein the first surface 302 is a top surface of the substrate 30. The micro-lenses 31 and 32 can be similar to those illustrated in FIG. 1, and repeated description is omitted herein.

Figure 20:
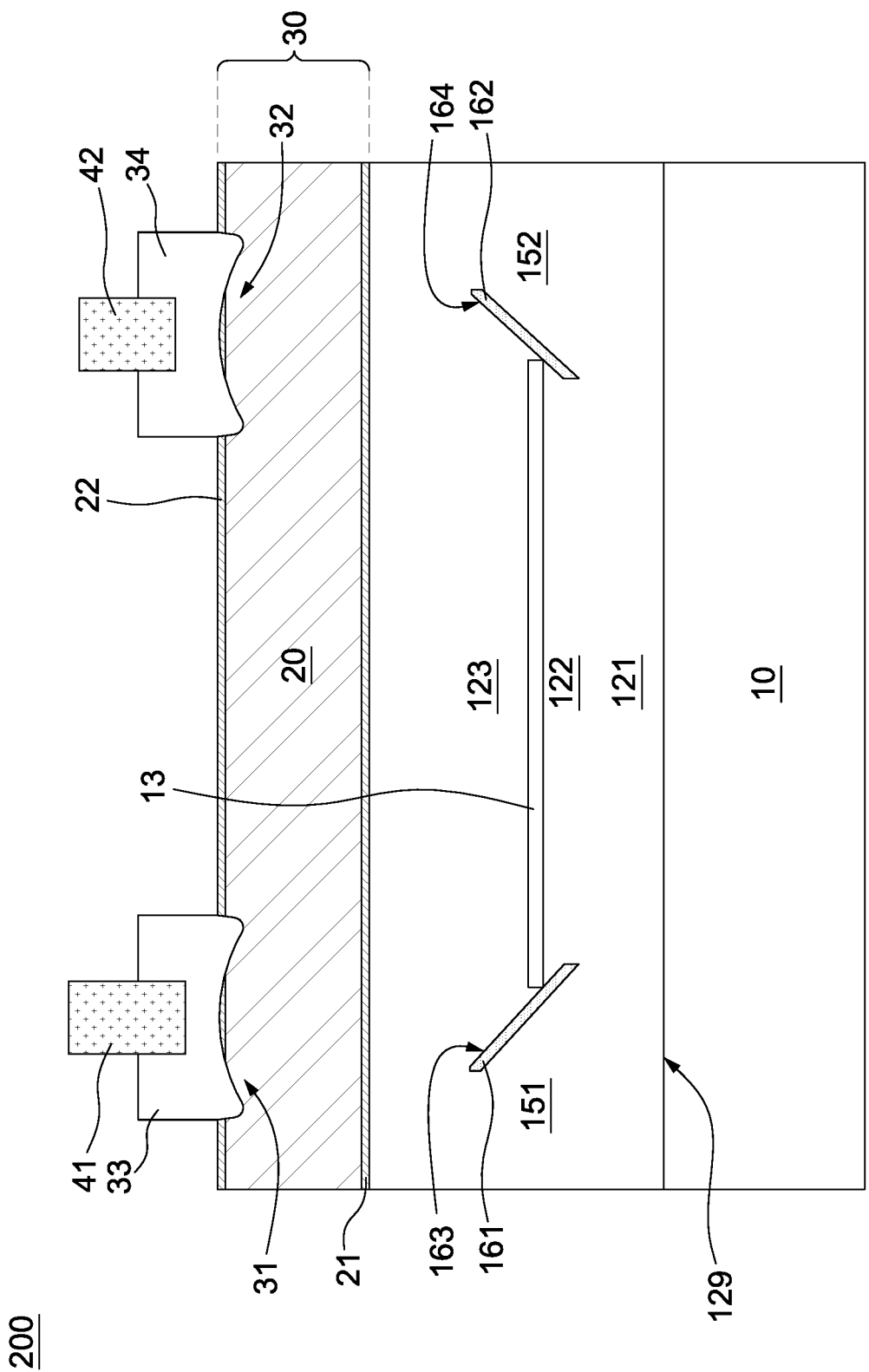

Referring to FIG. 20, which is a schematic cross-sectional diagram of a semiconductor structure at a stage of the method 600 in accordance with some embodiments of the present disclosure. After the formation of the micro-lenses 31 and 32, fibers 41 and 42 are fixed above the micro-lenses 31 and 32 through gel materials 33 and 34. In some embodiments, the gel materials 33 and 34 respectively cover an entirety of the micro-lens 31 and an entirety of the micro-lens 32. A semiconductor structure 200 similar to the semiconductor structure 100 shown in FIG. 1 is thereby formed as shown in FIG. 20.

The above description is for a purpose of illustration of the concept of the present disclosure, and the present disclosure is not limited to the embodiments as described above and illustrated in FIGS. 5 to 20. In order to achieve the purpose of the present disclosure as described above, in an alternative embodiment, a waveguide structure can be formed prior to formation of a reflective layer (i.e., the operation 603 of the method 600).

FIGS. 21 to 31 are schematic cross-sectional diagrams of a semiconductor structure at different stages of the method 600 in accordance with alternative embodiments of the present disclosure. For ease of illustration, reference numerals with similar or same functions and properties are repeated in different embodiments and figures. For a purpose of brevity, in the following specification, only differences from the embodiments described above are emphasized, and descriptions of similar or same elements, functions, properties and/or processing are omitted.

Figure 21:
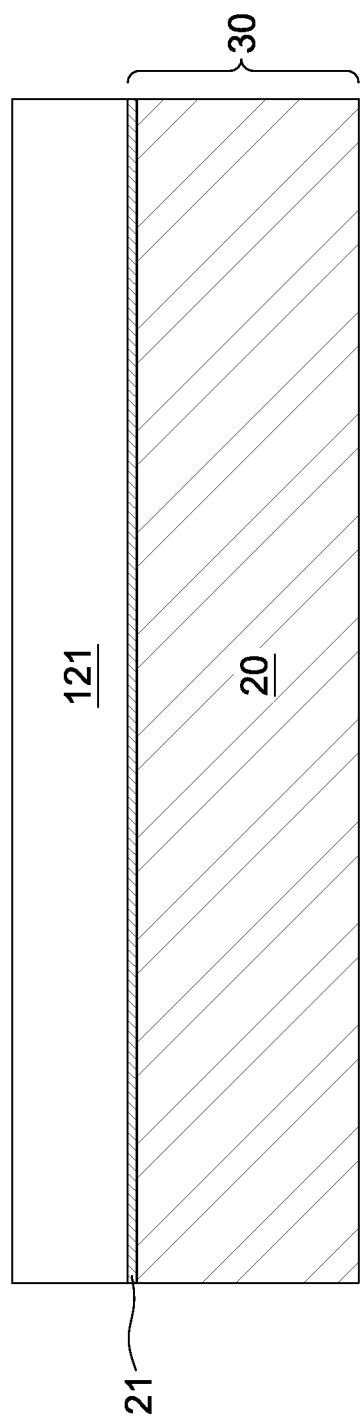
FIGS. 21 to 31 are schematic cross-sectional diagrams of a semiconductor structure at different stages of a manufacturing method in accordance with some embodiments of the disclosure.

FIG. 21 is a schematic cross-sectional diagram of a semiconductor structure at a stage of the method 600 in accordance with some embodiments of the present disclosure. In the operation 601, a dielectric layer 121 is formed over a substrate 30. In some embodiments, the dielectric layer 121 is similar to the dielectric sub-layer 121 described above, and repeated description is omitted herein. In some embodiments, the substrate 30 includes an ARC layer 21 formed on a semiconductive layer 20.

Figure 22:
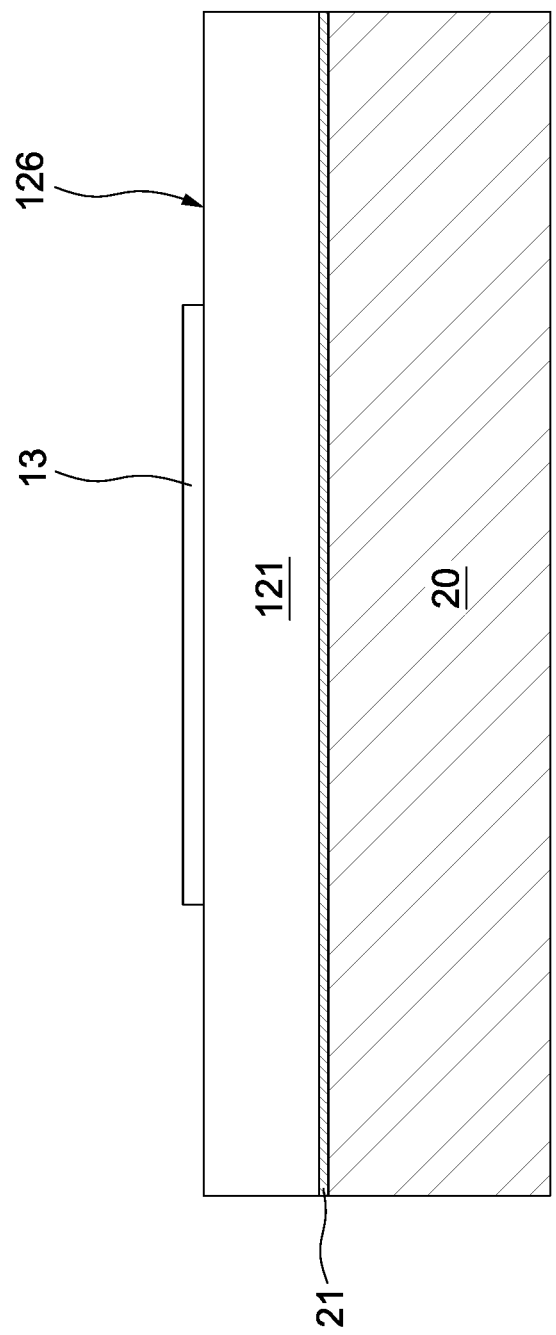

FIG. 22 is a schematic cross-sectional diagram of a semiconductor structure at a stage of the method 600 in accordance with some embodiments of the present disclosure. After the operation 601, the operation 603 is performed, and a waveguide structure 13 is formed over a first surface 126 of the dielectric layer 121 shown in FIG. 21. The operation as depicted in FIG. 16 is performed on the dielectric layer 121 after the operation 601. In some embodiments, the waveguide structure 13 is similar to the optical guiding layer 13 illustrated above, and repeated description is omitted herein.

Figure 23:
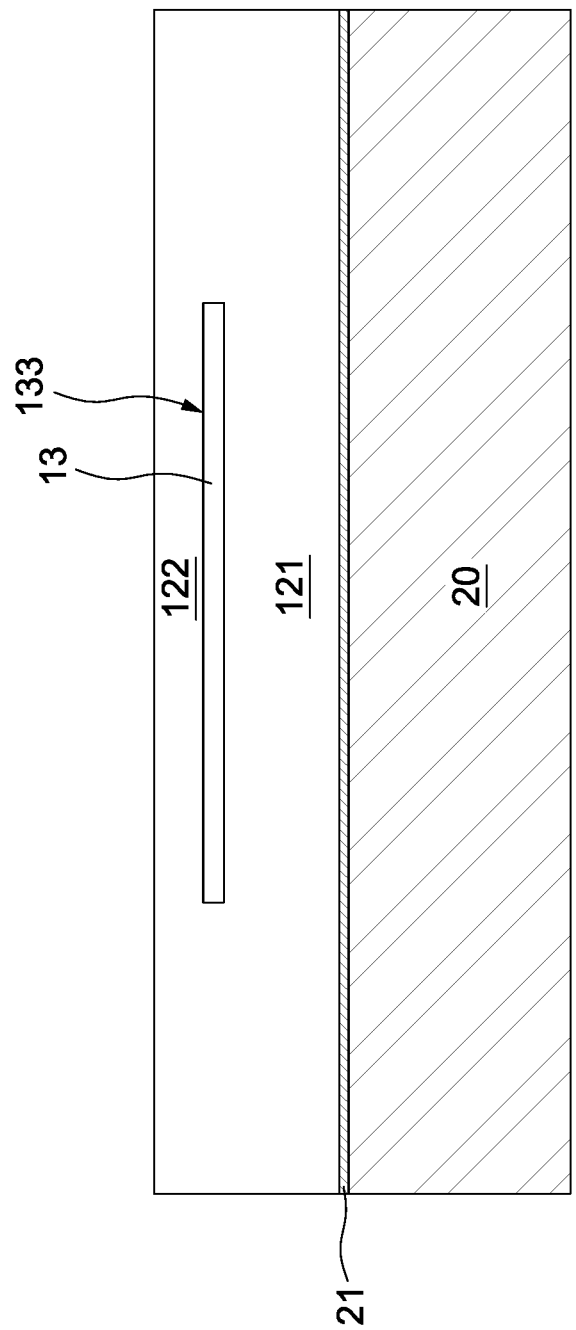

FIG. 23 is a schematic cross-sectional diagram of a semiconductor structure at a stage of the method 600 in accordance with some embodiments of the present disclosure. After the formation of the waveguide structure 13, a dielectric layer 122 is formed over the dielectric layer 121. In some embodiments, the dielectric layer 122 is similar to the dielectric sub-layer 122 described above. In some embodiments, a thickness of the dielectric layer 122 is greater than a thickness of the waveguide structure 13. In some embodiments, the dielectric layer 122 covers an entirety of the waveguide structure 13. In other embodiments, the thickness of the dielectric layer 122 is substantially equal to the thickness of the waveguide structure 13, and a top surface 133 of the waveguide structure 13 is exposed through the dielectric layer 122.

Figure 24:
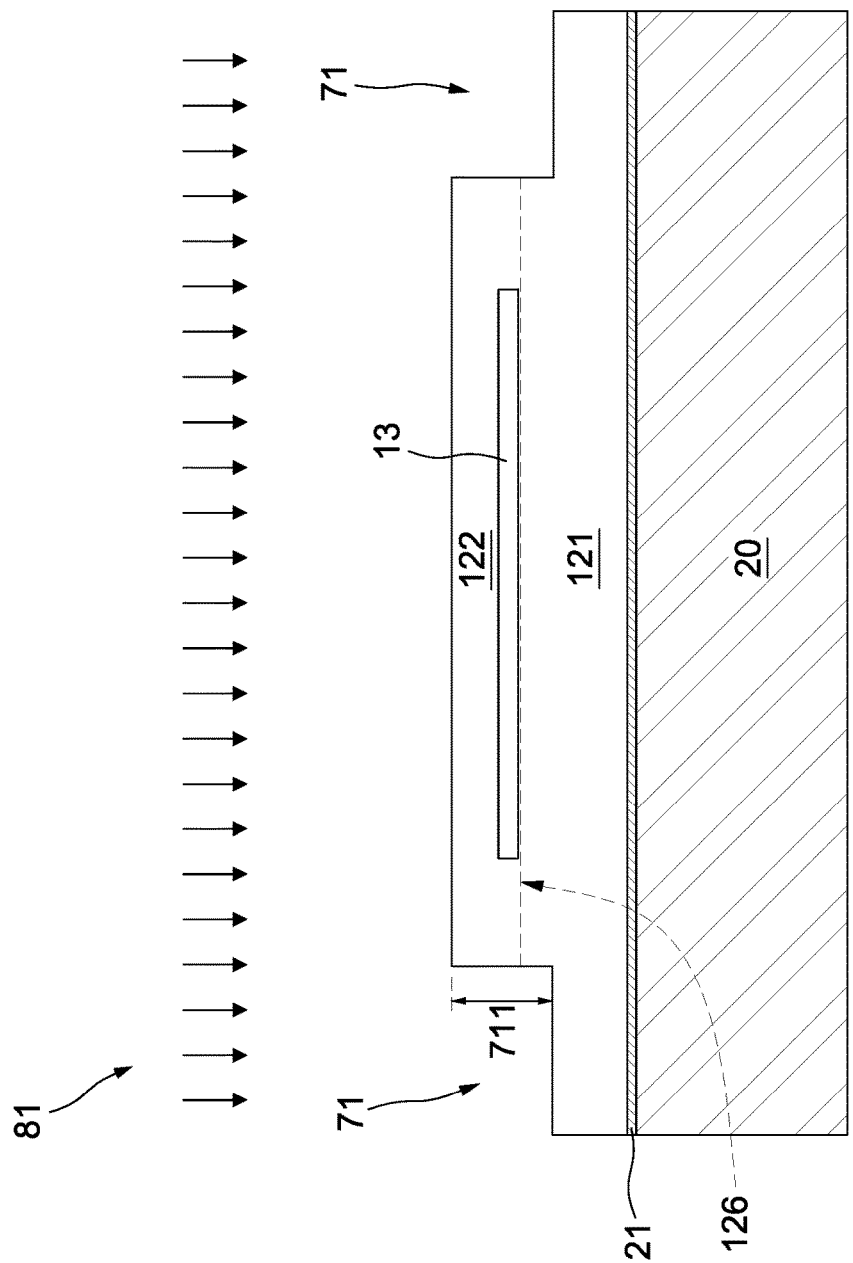

FIG. 24 is a schematic cross-sectional diagram of a semiconductor structure at a stage of the method 600 in accordance with some embodiments of the present disclosure. After the formation of the dielectric layer 122, a patterning operation 81 is performed. In some embodiments, a portion of the dielectric layer 122 is removed. In some embodiments, a portion of the dielectric layer 121 is also removed. It should be noted that a boundary or an interface between the dielectric layers 121 and 122 may be invisible. For a purpose of illustration, the first surface 126 of the dielectric layer 121, which can also represent the interface between the dielectric layers 121 and 122, is indicated as a dotted line. In some embodiments, an opening 71 is formed by the patterning operation 81. In some embodiments, a depth 711 of the opening 71 is greater than the thickness of the dielectric layer 122.

Figure 25:
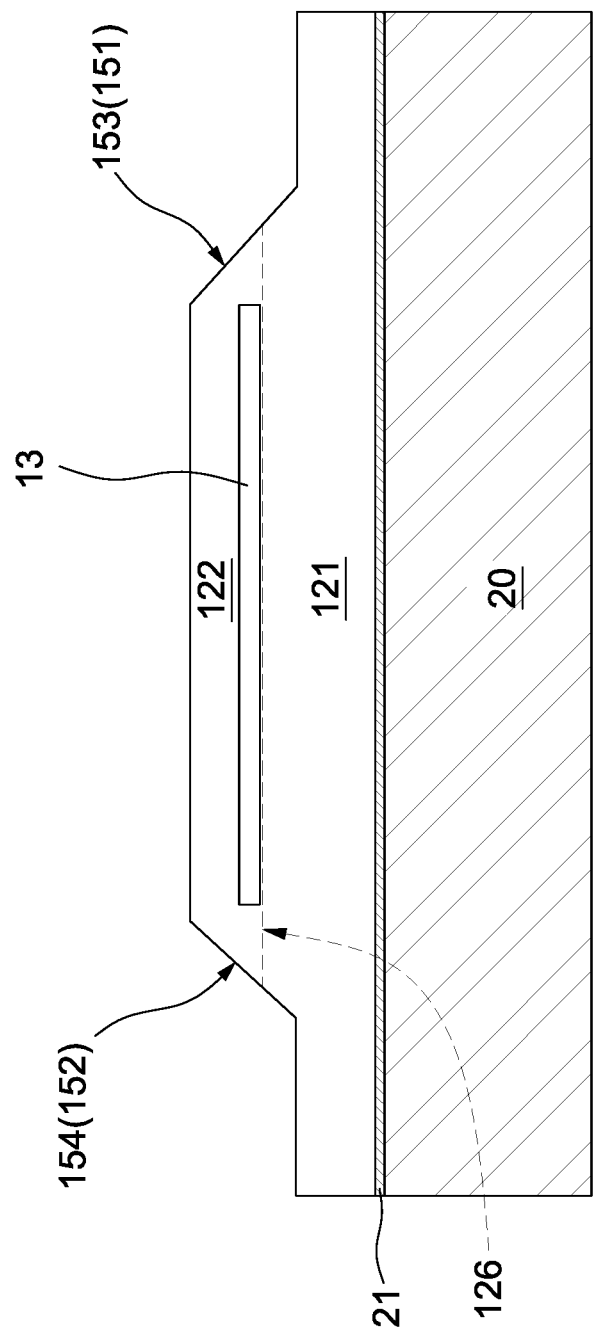

FIG. 25 is a schematic cross-sectional diagram of a semiconductor structure at a stage of the method 600 in accordance with some embodiments of the present disclosure. After the patterning operation 81, operations as depicted in FIGS. 7 to 12 are sequentially performed on the intermediate structure shown in FIG. 24. An inclined surface 153 of an inclined member 151 and an inclined surface 154 of an inclined member 152 are formed. In some embodiments, each of the inclined members 151 and 152 includes a portion of the dielectric layer 121 and a portion of the dielectric layer 122. In some embodiments, each of the inclined surfaces 153 and 154 extends through the dielectric layer 122 and across the interface 126 between the dielectric layers 121 and 122. In some embodiments, each of the inclined surfaces 153 and 154 stops at the dielectric layer 121.

Figure 26:
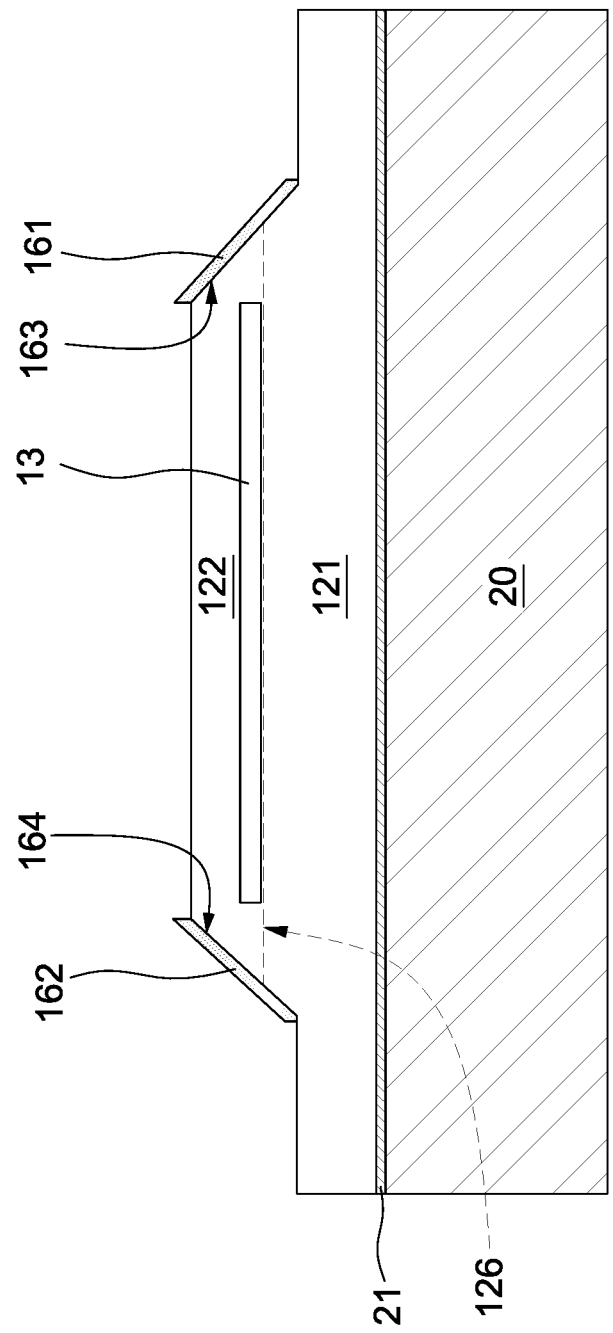

FIG. 26 is a schematic cross-sectional diagram of a semiconductor structure at a stage of the method 600 in accordance with some embodiments of the present disclosure. After the formation of the inclined members 151 and 152, operations as depicted in FIGS. 13 to 14 are sequentially performed on the intermediate structure shown in FIG. 25. A reflective layer 161 and a reflective layer 162 are thereby formed over and conformal to the inclined surfaces 153 and 154. The reflective layers 161 and 162 are similar to the optical reflective layers 161 and 162 described above, and repeated description is omitted herein. The reflective layer 161 includes a reflective surface 163 facing toward the waveguide structure 13, and the reflective layer 162 includes a reflective surface 164 facing toward the waveguide structure 13. In some embodiments, the reflective surfaces 163 and 164 face toward each other. In some embodiments, each of the reflective surfaces 163 and 164 covers an entirety of the inclined surface 153 or 154. In some embodiments, at least one of the reflective surfaces 163 and 164 covers only a portion of the inclined surface 153 or 154. In some embodiments, each of the reflective surfaces 163 and 164 extends through the dielectric layer 122 and across the interface 126 between the dielectric layers 121 and 122. In some embodiments, each of the reflective surfaces 163 and 164 stops at the dielectric layer 121.

Figure 27:
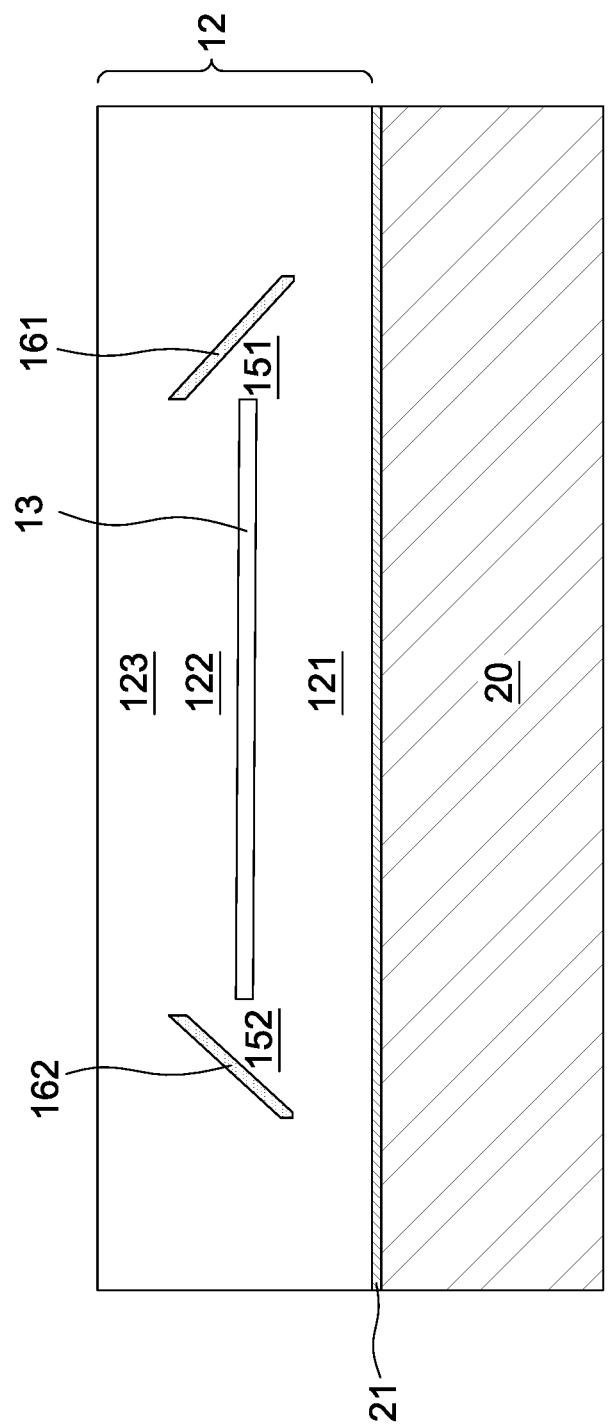

FIG. 27 is a schematic cross-sectional diagram of a semiconductor structure at a stage of the method 600 in accordance with some embodiments of the present disclosure. After the formation of the reflective layers (i.e., the operation 603), the operation as depicted in FIG. 17 is performed, and a dielectric layer 123 is formed covering the reflective layers 161 and 162 and the dielectric layers 121 and 122. In some embodiments, the dielectric layer 123 is similar to the dielectric sub-layer 123. In some embodiments, the dielectric layers 121, 122 and 123 together form a dielectric structure 12.

Figure 28:
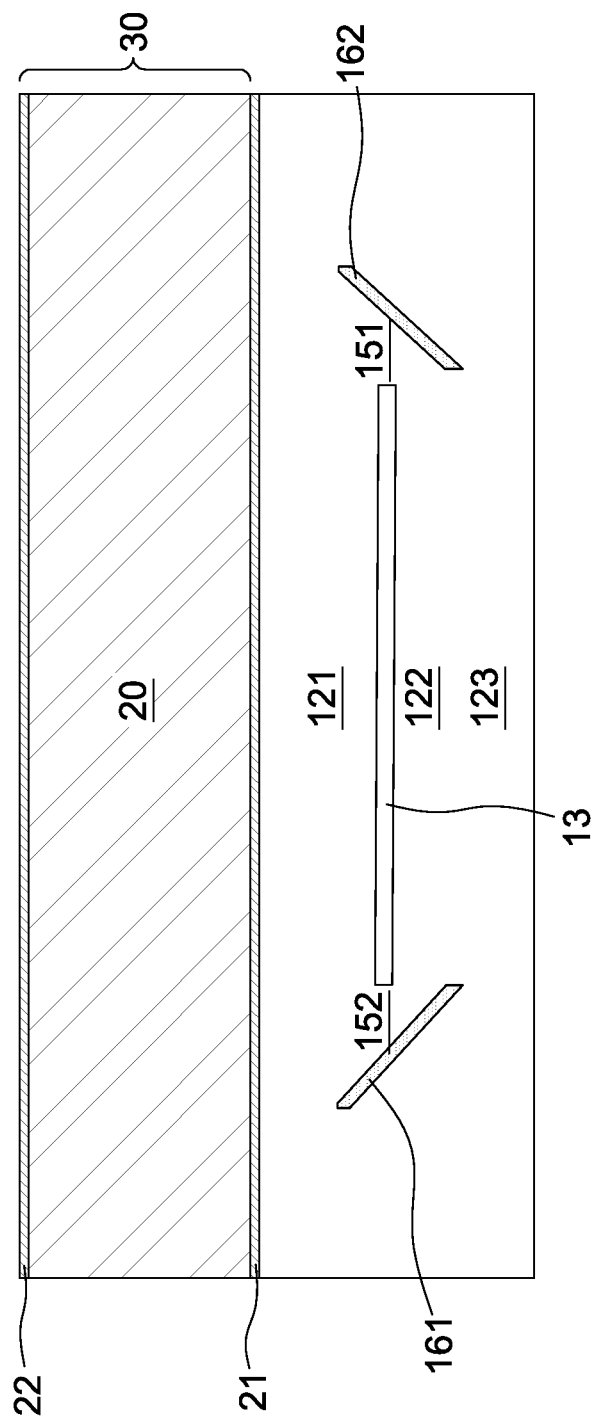

FIG. 28 is a schematic cross-sectional diagram of a semiconductor structure at a stage of the method 600 in accordance with some embodiments of the present disclosure. After the formation of the dielectric layer 123, the intermediate structure shown in FIG. 27 is then flipped over, and an ARC layer 22 is formed over the semiconductive layer 20 opposite to the ARC layer 21. In some embodiments, the ARC layer 22 is defined as a part of the substrate 30.

Figure 29:
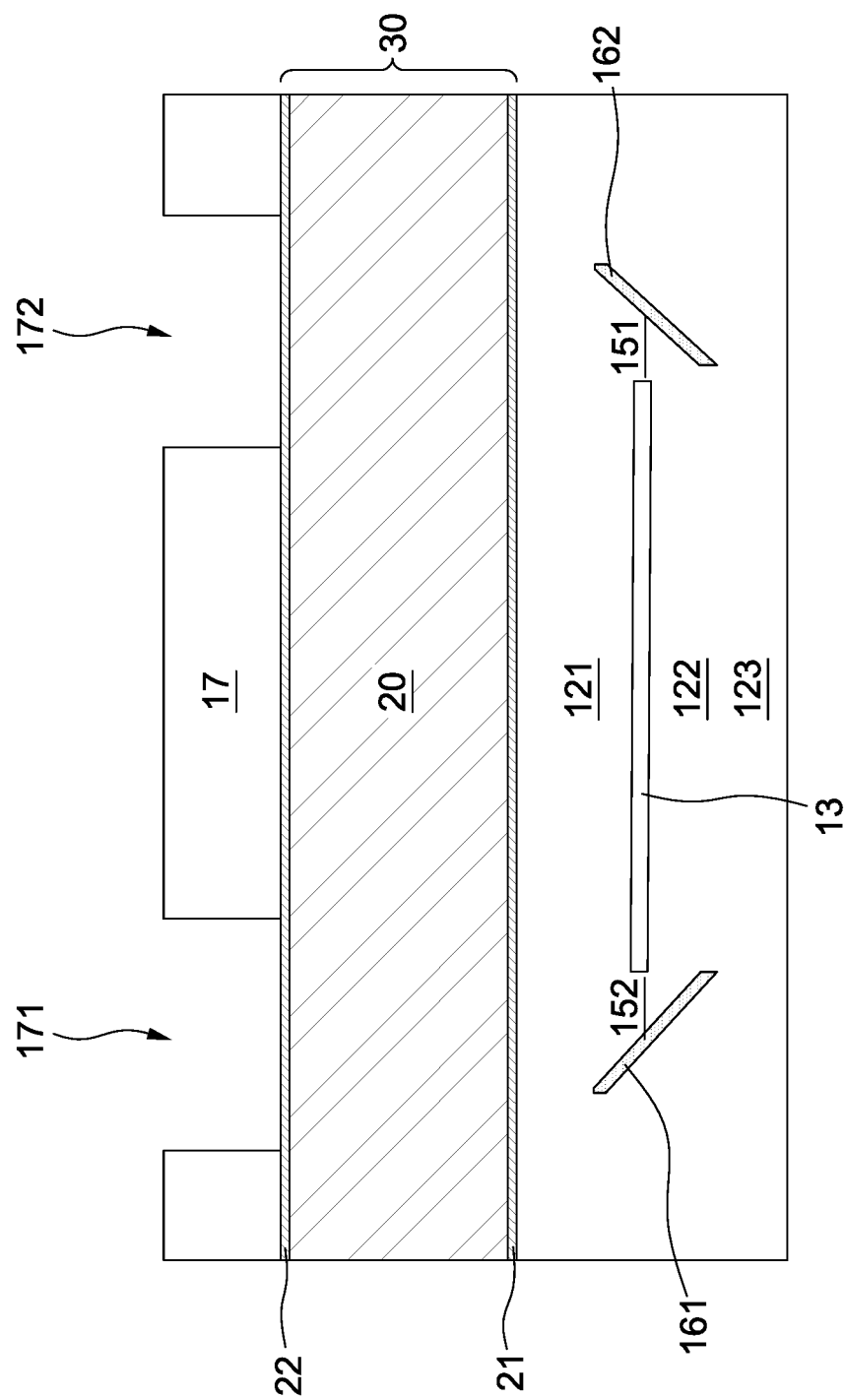

FIG. 29 is a schematic cross-sectional diagram of a semiconductor structure at a stage of the method 600 in accordance with some embodiments of the present disclosure. After the formation of the ARC layer 21, a supporting layer 17 may be optionally formed and patterned over the substrate 30. The supporting layer 17 may be configured to support fibers and/or define gel materials to be formed in later processing. In some embodiments, the supporting layer 17 includes one or more dielectric materials. In some embodiments, portions of the substrate 30 where micro-lenses are to be formed are exposed through the supporting layer 17. In some embodiments, an opening 171 of the supporting layer 17 exposes a portion of the substrate 30 vertically over the reflective layer 161. In some embodiments, an opening 172 of the supporting layer 17 exposes a portion of the substrate 30 vertically over the reflective layer 162.

Figure 30:
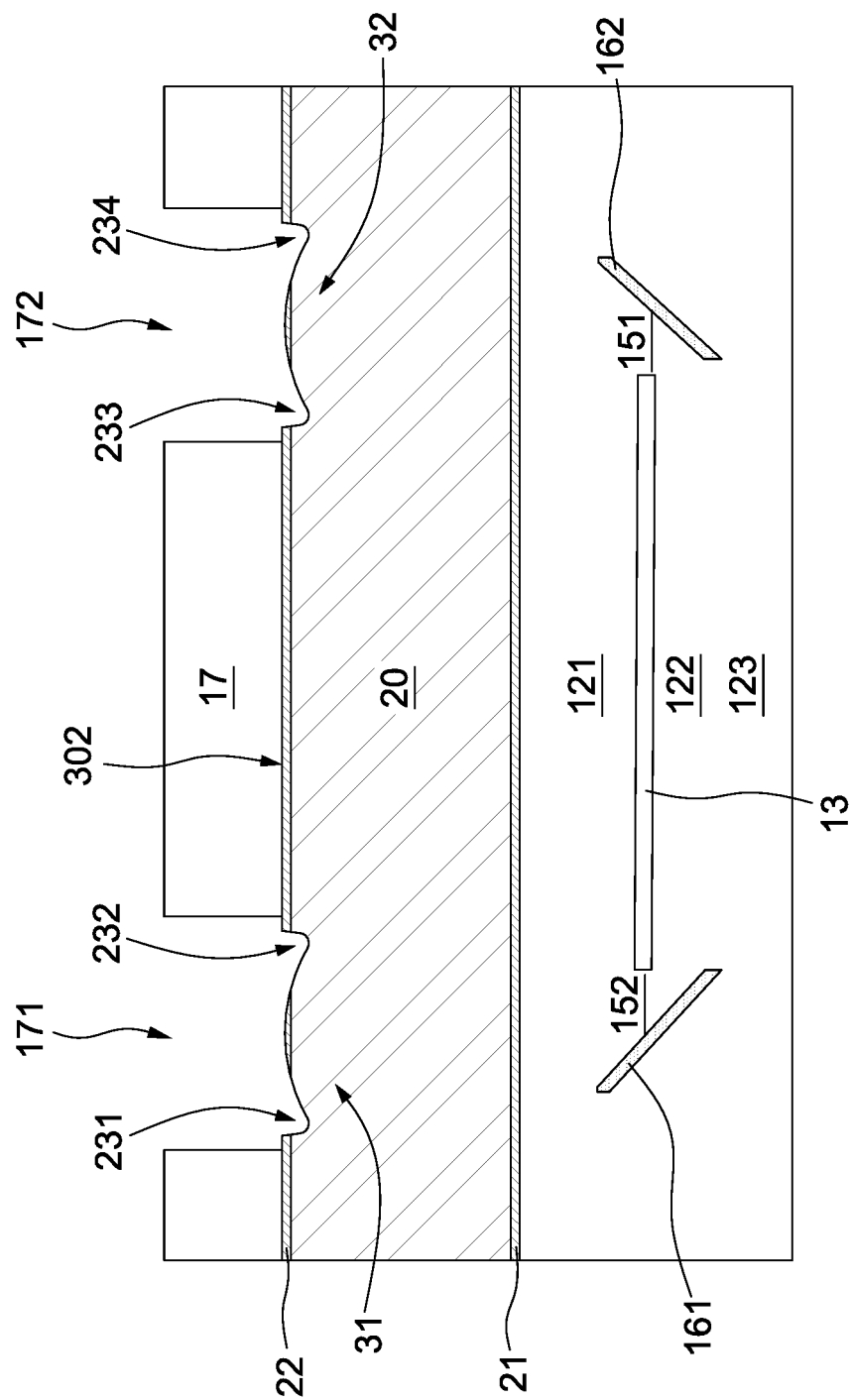

FIG. 30 is a schematic cross-sectional diagram of a semiconductor structure at a stage of the method 600 in accordance with some embodiments of the present disclosure. After the formation of the supporting layer 17, the operation as depicted in FIG. 19 is performed on the substrate 30, and a micro-lens 31 and a micro-lens 32 are thereby formed. A recess 231 and a recess 232 are formed in a surface 302 of the substrate 30 and define the micro-lens 31, and a recess 233 and a recess 234 are formed in the surface 302 of the substrate 30 and define the micro-lens 32. In some embodiments, sidewalls of the recess 231 and the recess 232 are aligned with sidewalls of the opening 171. In some embodiments, sidewalls of the recess 233 and the recess 234 are within a coverage area of the opening 172.

Figure 31:
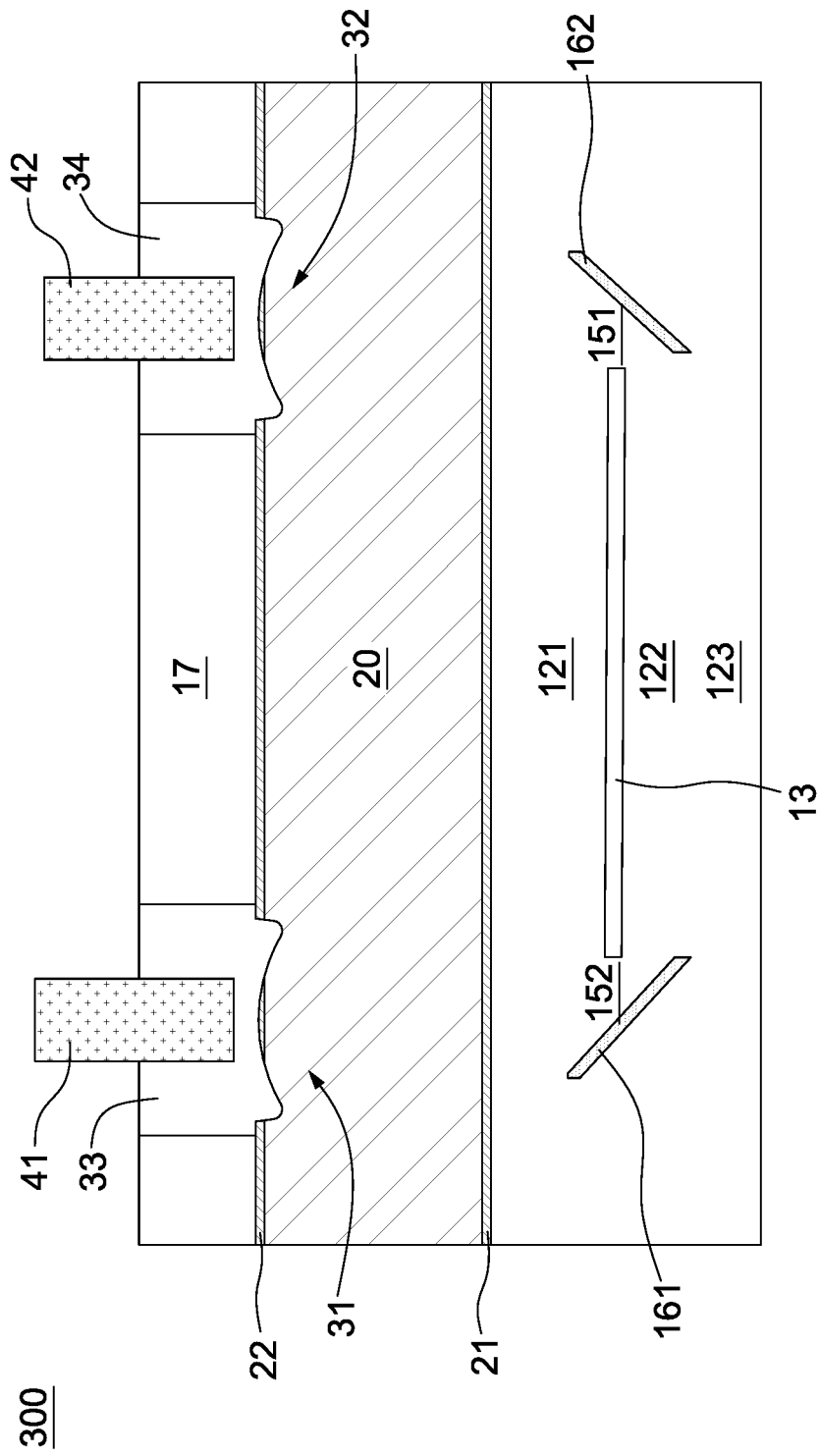

FIG. 31 is a schematic cross-sectional diagram of a semiconductor structure at a stage of the method 600 in accordance with some embodiments of the present disclosure. After the formation of the micro-lenses 31 and 32, the operation as depicted in FIG. 20 is performed, and a semiconductor structure 300 is thereby formed. In some embodiments, a gel material 33 fills the opening 171, and a fiber 41 is inserted into the gel material 33 before the gel material 33 is cured. In some embodiments, a gel material 34 fills the opening 172, and a fiber 42 is inserted into the gel material 34 before the gel material 34 is cured.

An optical signal with a certain range of wavelengths can be transmitted through the reflective layers 161 and 162 and the waveguide structure 13. A waveguide structure (e.g., the waveguide structure 13) surrounded by two reflective layers (e.g., the reflective layers 161 and 162) can be considered as an optical unit. In order to transmit multiple ranges of wavelengths, multiple optical units can be applied in a semiconductor structure.

Figure 32:
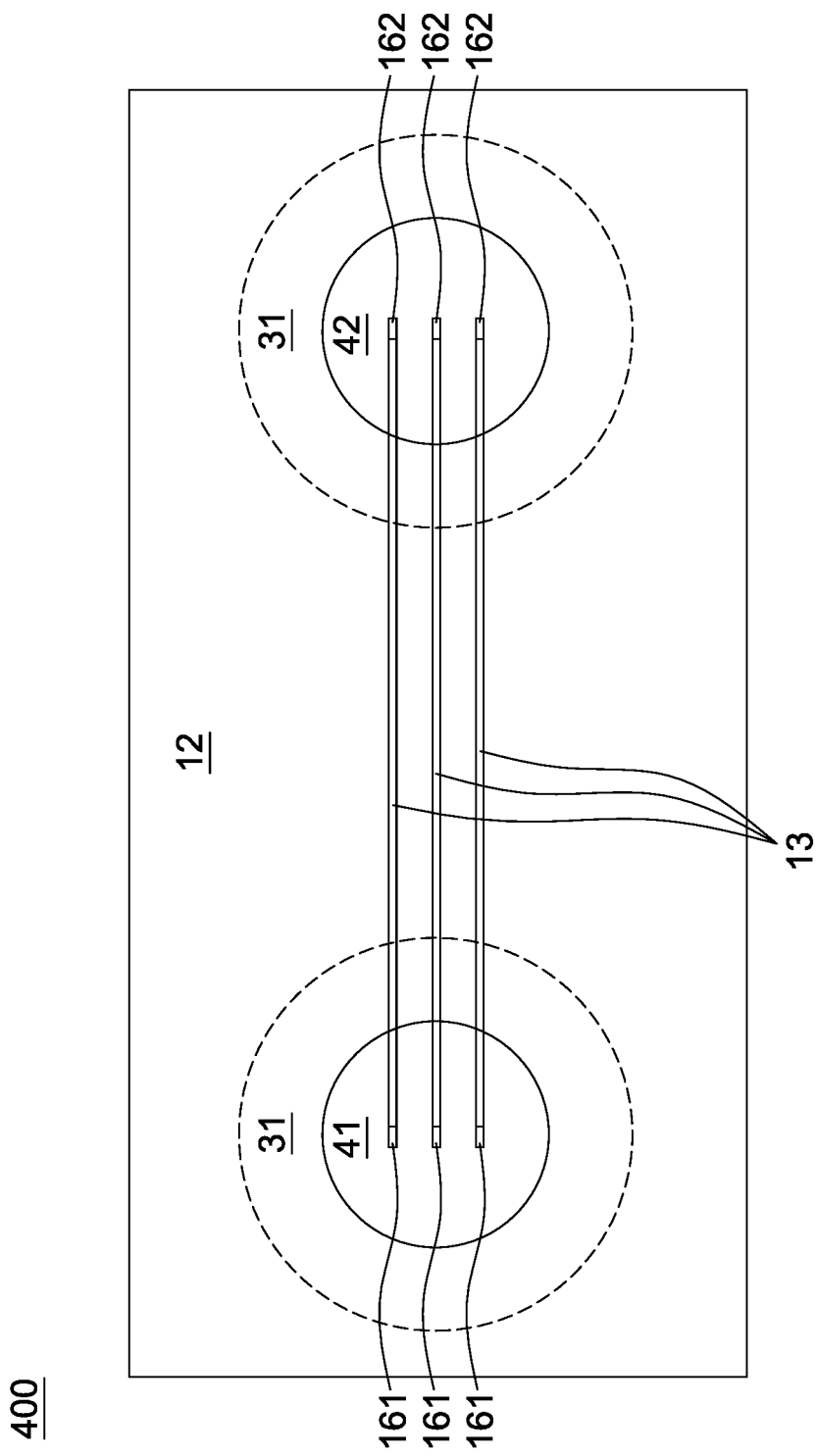
FIG. 32 is a schematic top view perspective of a semiconductor structure in accordance with some embodiments of the disclosure.
Figure 33:
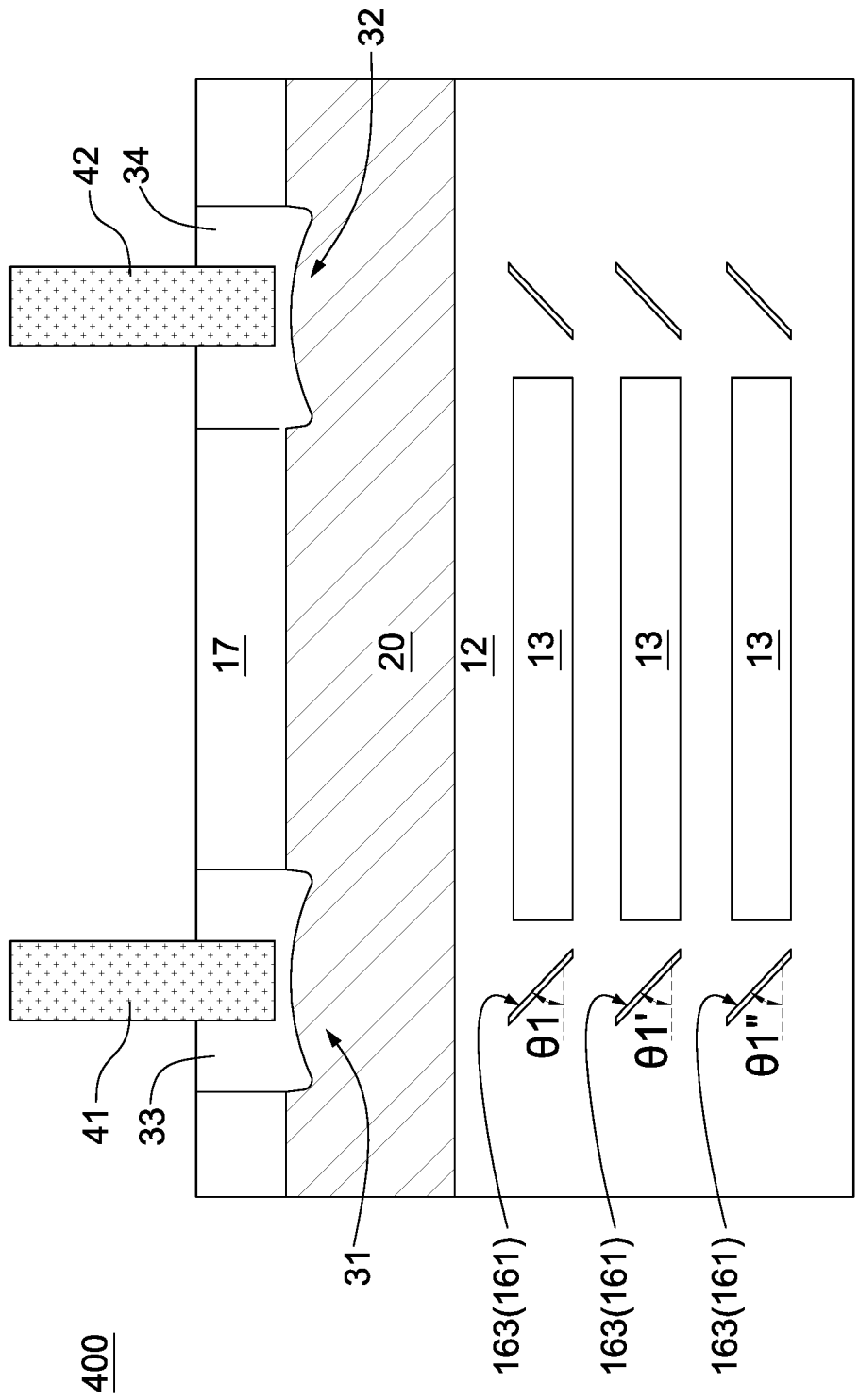
FIG. 33 is a schematic side view perspective of the semiconductor structure of FIG. 32 in accordance with some embodiments of the disclosure.
Figure 35:
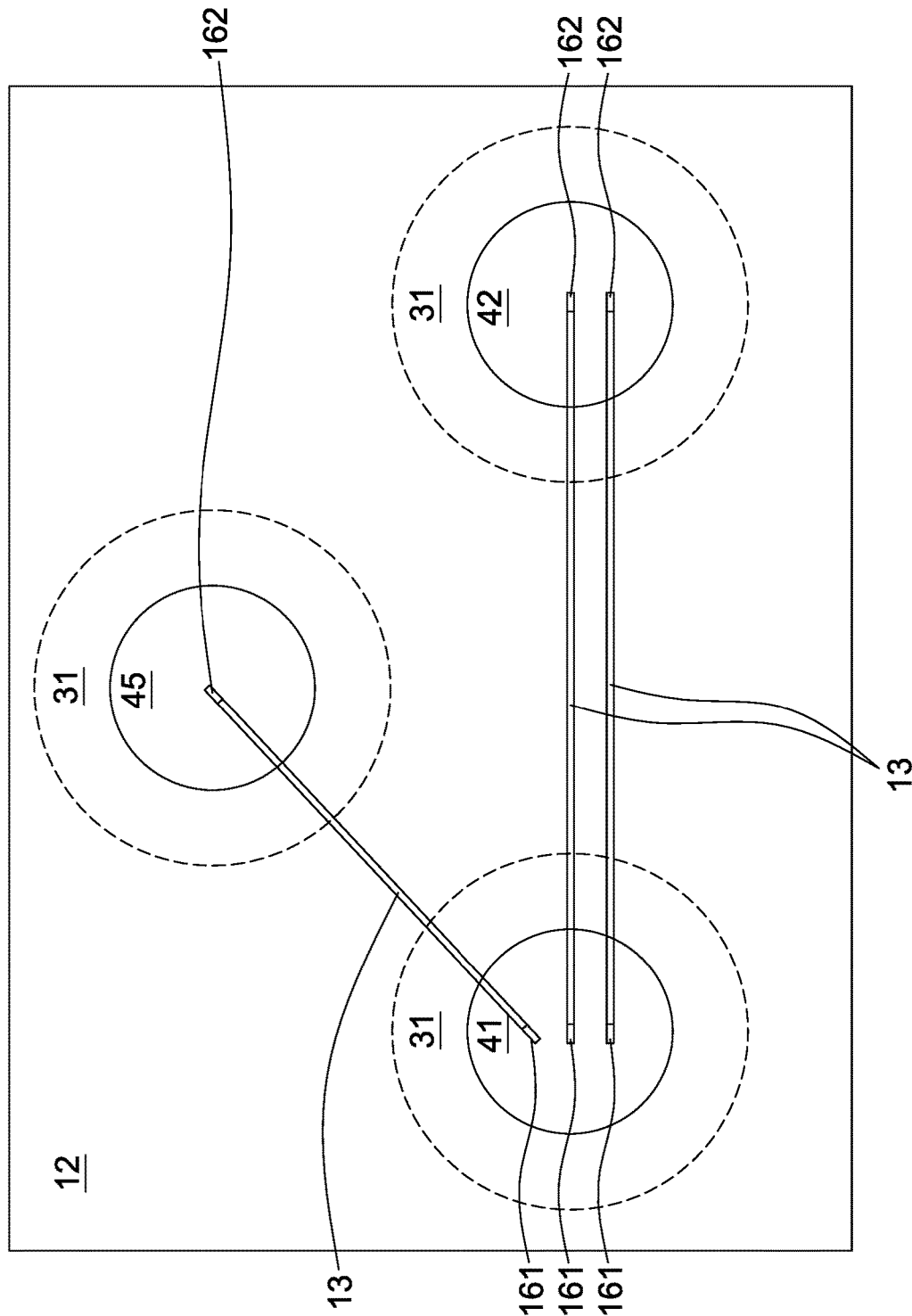
FIG. 35 is a schematic top view perspective of a semiconductor structure in accordance with some embodiments of the disclosure.

FIG. 32 is a schematic top view perspective of a semiconductor structure 400, and FIG. 33 is a schematic cross-sectional view of the semiconductor structure 400 in accordance with some embodiments of the present disclosure. The semiconductor structure 400 may include multiple optical units arranged in a staggered manner and disposed at different elevations as shown in FIG. 32. In some embodiments, the optical units (each of which includes a reflective layer 161, a waveguide structure 13, and a reflective layer 162 arranged on a same horizontal line as shown in FIG. 32) are offset from each other from a top view perspective as shown in FIG. 32. The reflective layers 161 and/or 162 of different optical units may have same or different elevation angles. As shown in FIG. 33, elevation angles θ1, θ1' and θ1" of inclined surfaces 163 of reflective layers 161 of different optical units can be same or different. The elevation angles θ1, θ1' and θ1" can be adjusted depending on different wavelengths. In some embodiments, the optical units are substantially parallel to each other. It should be noted that the three optical units are shown in the semiconductor structure 400 for a purpose of illustration, and a number of the optical units can be adjusted according to different applications. In addition, optical units may or may not extend in a same direction as shown in FIG. 32. In an alternative embodiment of a semiconductor structure 700 as shown in FIG. 35, some optical units extend between fibers 41 and 42, and one optical unit extends between fibers 41 and 45. Therefore, transmission of multiple ranges of wavelengths (or multiple wavelength bands of optical signals) can be achieved. Moreover, signal transmission between different devices at different locations of a semiconductor structure can also be achieved.

Figure 34:
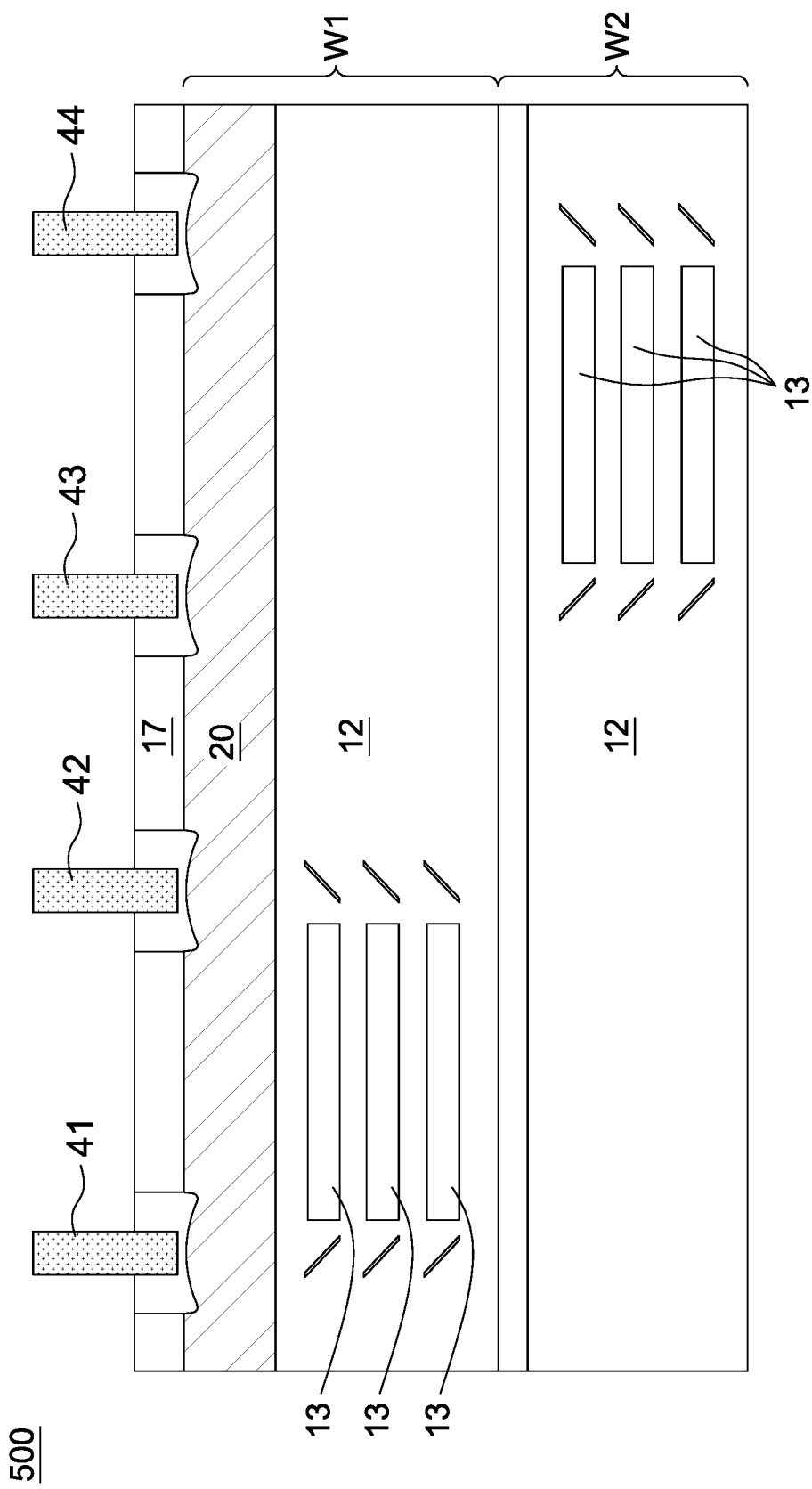
FIG. 34 is a schematic side view perspective of a semiconductor structure in accordance with some embodiments of the disclosure.

The above description is for a purpose of illustration of the concept of the present disclosure, and the present disclosure is not limited to the embodiments as described above. The present disclosure can also be applied in a wafer-on-wafer (WOW) structure. FIG. 34 is a schematic cross-sectional view of a semiconductor structure 500 in accordance with some embodiments of the present disclosure. The semiconductor structure 500 may include multiple wafers. In some embodiments, the semiconductor structure includes a wafer W2 bonded to a wafer W1. In some embodiments, the operations as depicted in FIGS. 5 to 18 or the operations as depicted in FIGS. 21 to 28 are performed to form the wafer W1 and the wafer W2. The wafer W2 may be bonded to the wafer W1, and the operations as depicted in FIGS. 19 to 20 or the operations as depicted in FIGS. 29 to 31 may then be performed on a side of the wafer W1 opposite to the wafer W2. In some embodiments, a thickness of a semiconductive layer 20 of the wafer W2 is reduced by, for example, a planarization or a chemical mechanical polish (CMP) prior to the bonding of the wafer W2 to the wafer W1.

In accordance with some embodiments of the disclosure, a semiconductor structure is provided. The semiconductor structure includes a substrate, a dielectric layer disposed over a first surface of the substrate, and an optical reflective layer disposed within the dielectric layer, wherein the optical reflective layer has an inclined surface.

In accordance with some embodiments of the disclosure, a semiconductor structure is provided. The semiconductor structure includes a dielectric layer, a first waveguide structure, a reflective layer, a semiconductive layer, and a micro-lens. The first waveguide structure is disposed in the dielectric layer and extends along a first direction. The reflective layer is disposed in the dielectric layer and includes an inclined surface configured to redirect an optical signal from a second direction to the first direction. The semiconductive layer is disposed over the dielectric layer. The micro-lens is disposed at the semiconductive layer, wherein an optical signal travels into the semiconductive layer through the micro-lens along the second direction.

In accordance with some embodiments of the disclosure, a method for manufacturing a semiconductor structure is provided. The method may include several operations. A first dielectric layer is formed over a substrate. A portion of the first dielectric layer is removed, thereby forming an inclined member. A reflective layer is formed over the inclined member, wherein the reflective layer includes an inclined surface conformal to the inclined member. A waveguide structure is formed adjacent to the inclined surface of the reflective layer. A second dielectric layer covering the reflective layer and the waveguide structure is formed.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A semiconductor structure, comprising:
    a substrate;
    a dielectric layer, disposed over a first surface of the substrate; and
    a first optical reflective layer disposed within the dielectric layer, wherein the first optical reflective layer has a first inclined surface;
    a second optical reflective layer, disposed below the first optical reflective layer and within the dielectric layer, wherein the second optical reflective layer has a second inclined surface;
    a first optical guiding layer disposed within the dielectric layer and adjacent to the first optical reflective layer, wherein
    when an optical signal is transmitted in the dielectric layer, a first portion of the optical signal is transmitted toward the first optical reflective layer in a first direction, and wherein when the first portion of the optical signal is reflected by the first inclined surface of the first optical reflective layer, the first portion of the optical signal is transmitted in the dielectric layer toward a first sidewall of the first optical guiding layer in a second direction,
    a second optical guiding layer disposed below the first optical guiding layer, within the dielectric layer, and adjacent to the second optical reflective layer, wherein when a second portion of the optical signal is transmitted in the dielectric layer, the second portion of the optical signal is transmitted toward the second optical reflective layer in the first direction, and wherein when the second portion of the optical signal is reflected by the second inclined surface of the second optical reflective layer, the second portion of the optical signal is transmitted in the dielectric layer toward a second sidewall of the second optical guiding layer in the second direction, wherein the first optical guiding layer and the second optical guiding layer are substantially parallel to each other, wherein the second inclined surface of the second optical reflective layer faces the second sidewall of the second optical guiding layer, and wherein the first sidewall of the first optical guiding layer is coplanar with the second sidewall of the second optical guiding layer.

2. The semiconductor structure of claim 1, further comprising:
    a micro-lens, disposed at a second surface of the substrate, wherein the second surface of the substrate is opposite to the first surface of the substrate.

3. The semiconductor structure of claim 2, wherein a top of the micro-lens is lower than a top surface of the substrate surrounding the micro-lens.

4. The semiconductor structure of claim 2, wherein the micro-lens and the substrate form a monolithic structure.

5. The semiconductor structure of claim 2, wherein a diameter of the micro-lens is greater than a diameter of an optical fiber aligned with the micro-lens.

6. The semiconductor structure of claim 1,
    wherein the first optical reflective layer includes one or more metals.

7. The semiconductor structure of claim 6, wherein a distance between the first optical reflective layer and the first sidewall of the first optical guiding layer is in a range of 0 to 30 microns.

8. The semiconductor structure of claim 1, wherein a thickness of the first optical reflective layer is in a range of 1 to 100 microns.

9. A semiconductor structure, comprising:
- a dielectric layer;
- a first optical guiding layer, disposed in the dielectric layer and extending along a first direction;
- a first optical reflective layer, disposed in the dielectric layer and including a first inclined surface and a first back surface opposite to the first inclined surface, wherein the first inclined surface is configured to change a traveling direction of an optical signal from a second direction to the first direction, wherein the first optical guiding layer is adjacent to the first optical reflective layer;
- a second optical reflective layer, disposed in the dielectric layer and including a second inclined surface and a second back surface opposite to the second inclined surface, wherein the second inclined surface is configured to change the traveling direction of the optical signal from the second direction to the first direction;
- a second optical guiding layer disposed below the first optical guiding layer, within the dielectric layer, and adjacent to the second optical reflective layer,
- a semiconductive layer, disposed over the dielectric layer; and
- a micro-lens, disposed at the semiconductive layer,
- wherein when a first portion of the optical signal is transmitted into the semiconductive layer through the micro-lens along the second direction, the first portion of the optical signal is further transmitted in the dielectric layer and toward the first optical reflective layer in the second direction, and wherein when the first portion of the optical signal is reflected by the first inclined surface of the first optical reflective layer, the first portion of the optical signal is transmitted in the dielectric layer toward a first sidewall of the first optical guiding layer in the first direction,
- wherein when a second portion of the optical signal is transmitted into the semiconductive layer through the micro-lens along the second direction, the second portion of the optical signal is further transmitted in the dielectric layer and toward the second optical reflective layer in the second direction, and wherein when the second portion of the optical signal is reflected by the second inclined surface of the second optical reflective layer, the second portion of the optical signal is transmitted in the dielectric layer toward a second sidewall of the second optical guiding layer in the first direction, wherein the first sidewall of the first optical guiding layer is coplanar with the second sidewall of the second optical guiding layer.

10. The semiconductor structure of claim 9, wherein the semiconductive layer includes silicon.

11. The semiconductor structure of claim 9, wherein at least a portion of the first inclined surface of the first optical reflective layer is separated from the first optical guiding layer by a portion of the dielectric layer.

12. The semiconductor structure of claim 9, wherein the first optical guiding layer includes silicon, silicon nitride, or a combination thereof, and the semiconductor structure further comprises a first antireflective coating (ARC) layer disposed between the semiconductive layer and the dielectric layer, and a second ARC layer disposed on a surface of the semiconductive layer opposite to the first ARC layer.

13. The semiconductor structure of claim 9, wherein the first direction is substantially perpendicular to the second direction.

14. The semiconductor structure of claim 9, wherein the first optical reflective layer includes one or more metals.

15. The semiconductor structure of claim 9, wherein an elevation angle of the first inclined surface of the first optical reflective layer is in a range of 30 to 60 degrees.

16. The semiconductor structure of claim 9, wherein the micro-lens is in a recessed portion of a top surface of the semiconductive layer.

17. The semiconductor structure of claim 9, wherein a curvature radius of the micro-lens is in a range of 100 to 500 microns.

18. A semiconductor structure, comprising:
- a first optical reflective layer, disposed in a dielectric layer, wherein the dielectric layer has an upper surface and a lower surface opposite to the upper surface, the first optical reflective layer has a first inclined surface facing the upper surface of the dielectric layer;
- a second optical reflective layer disposed below the first optical reflective layer and in the dielectric layer, the second optical reflective layer has a second inclined surface facing the upper surface of the dielectric layer;
- a first optical guiding layer, disposed in the dielectric layer and adjacent to the first optical reflective layer,
- a second optical guiding layer disposed below the first optical guiding layer, within the dielectric layer, and adjacent to the second optical reflective layer, and
- a first micro-lens disposed over the first optical reflective layer, wherein the first optical reflective layer is within an area of a vertical projection of the first micro-lens, wherein
- when a first portion of an optical signal is transmitted in the dielectric layer, the first portion of the optical signal is transmitted toward the first optical reflective layer in a first direction and when the first portion of the optical signal is reflected by the first inclined surface of the first optical reflective layer, the first portion of the optical signal is transmitted in the dielectric layer toward a first sidewall of the first optical guiding layer in a second direction,
- when a second portion of the optical signal is transmitted in the dielectric layer, the second portion of the optical signal is transmitted toward the second optical reflective layer in the first direction and when the second portion of the optical signal is reflected by the second inclined surface of the second optical reflective layer, the second portion of the optical signal is transmitted in the dielectric layer toward a second sidewall of the second optical guiding layer in the second direction, wherein the first sidewall of the first optical guiding layer is coplanar with the second sidewall of the second optical guiding layer.

19. The semiconductor structure of claim 18, wherein the first optical reflective layer includes one or more metals.

20. The semiconductor structure of claim 18, wherein at least a portion of the first inclined surface of the first optical reflective layer is separated from the first optical guiding layer by a portion of the dielectric layer.

* * * * *